(12) United States Patent
Dasala et al.

(10) Patent No.: US 12,468,024 B2
(45) Date of Patent: Nov. 11, 2025

(54) AMBIENT INTERNET-OF-THINGS OPERATIONS WITH A FREQUENCY SCANNING ANTENNA ARCHITECTURE

(71) Applicant: QUALCOMM Incorporated, San Diego, CA (US)

(72) Inventors: Keerthi Priya Dasala, West Lafayette, IN (US); Navid Abedini, Basking Ridge, NJ (US)

(73) Assignee: Qualcomm Incorporated, San Diego, CA (US)

( * ) Notice: Subject to any disclaimer, the term of this patent is extended or adjusted under 35 U.S.C. 154(b) by 75 days.

(21) Appl. No.: 18/605,662

(22) Filed: Mar. 14, 2024

(65) Prior Publication Data

US 2025/0291045 A1 Sep. 18, 2025

(51) Int. Cl.
| | | |
|---|---|---|
| *G01S 13/42* | (2006.01) | |
| *H01Q 3/22* | (2006.01) | |
| *H01Q 21/00* | (2006.01) | |
| *H02J 50/20* | (2016.01) | |

(52) U.S. Cl.
CPC ............ *G01S 13/426* (2013.01); *H02J 50/20* (2016.02); *H01Q 3/22* (2013.01); *H01Q 21/0006* (2013.01)

(58) Field of Classification Search
CPC .......... G01S 13/426; H02J 50/20; H01Q 3/22; H01Q 21/0006
See application file for complete search history.

(56) References Cited

U.S. PATENT DOCUMENTS

2024/0005267 A1\* 1/2024 Graube .............. G06Q 10/0833

\* cited by examiner

*Primary Examiner* — Monica C King
(74) *Attorney, Agent, or Firm* — Holland & Hart LLP

(57) ABSTRACT

Methods, systems, and devices for wireless communications are described. The described techniques provide for an energy harvesting (EH)-capable device to indicate, to a reader wireless device, capabilities of the EH-capable device to use a frequency scanning antenna (FSA) array. In some examples, the capability report may indicate one or more modes supported by the EH-capable device, where a mode may indicate one or more operations supported by the EH-capable device using one or more antenna ports associated with the FSA array. For example, the EH-capable device may indicate a capability to communicate using two different antenna ports and may indicate a capability to perform concurrent operations using the two different antenna ports. In some examples, the mode of the EH-capable device may indicate which operations are performable using each antenna port, and the EH-capable device may communicate with the reader wireless device to determine a mode for communications.

30 Claims, 14 Drawing Sheets

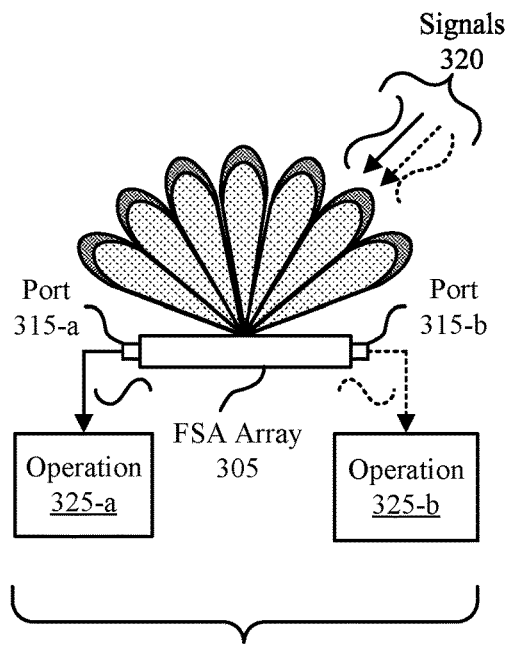
FIG. 3A ↙ 301
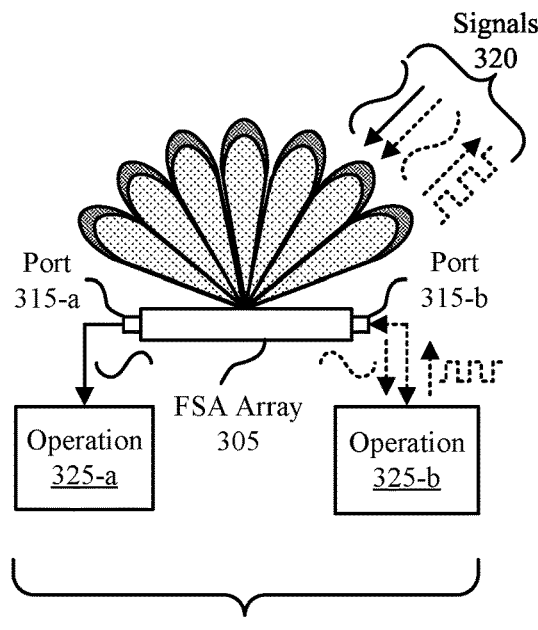
FIG. 3B ↙ 302
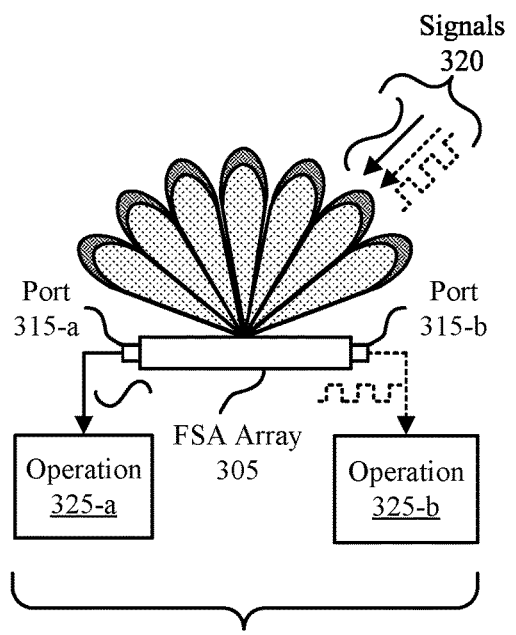
FIG. 3C ↙ 303
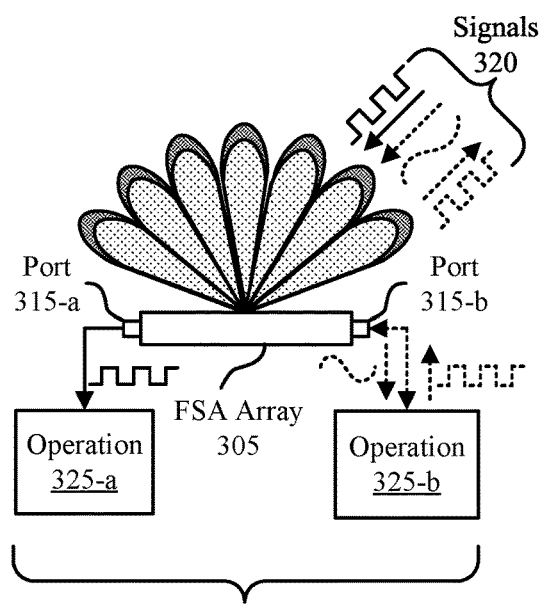
FIG. 3D ↙ 304

AMBIENT INTERNET-OF-THINGS OPERATIONS WITH A FREQUENCY SCANNING ANTENNA ARCHITECTURE

FIELD OF TECHNOLOGY

The following relates to wireless communications, including ambient internet-of-things (IoT) operations with a frequency scanning antenna (FSA) architecture.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a wireless device may be an example of an energy harvesting (EH)-capable device, and a network device may provide energy to the EH-capable device wirelessly.

SUMMARY

The described techniques relate to improved methods, systems, devices, and apparatuses that support ambient internet-of-things (IoT) operations with a frequency scanning antenna (FSA) architecture. For example, the described techniques provide for an energy harvesting (EH)-capable device to indicate, to a reader wireless device, capabilities of the EH-capable device to use an FSA array, which may support the EH-capable device communicating via relatively high frequencies using beamformed communications. In some examples, the capability report may indicate one or more modes supported by the EH-capable device, where a mode may indicate one or more operations supported by the EH-capable device using one or more antenna ports associated with the FSA array. For example, the EH-capable device may indicate a capability to communicate using two different antenna ports and may indicate a capability to perform concurrent operations using the two different antenna ports. Such operations may include an EH operation (e.g., storing energy from a received signal), reflecting an uplink signal (e.g., backscattering a beamformed signal), receiving a downlink signal (e.g., attempting to decode data included in a signal), or any combination thereof. In some examples, the mode of the EH-capable device may indicate which operations are performable using each antenna port, and the EH-capable device may communicate with the reader wireless device to determine a mode for communications. For example, the reader wireless device may indicate modes supported by the reader wireless device, the EH-capable device may indicate a selected or recommended mode to the reader wireless device, or both.

A method for wireless communications by an EH-capable device is described. The method may include transmitting a capability report that indicates a capability of the EH-capable device to use an FSA array at the EH-capable device, where the capability report indicates one or more modes supported by the EH-capable device in association with use of the FSA array, operating, in accordance with the capability of the EH-capable device, in a first mode of the one or more modes, where operation in the first mode includes a first type of operation performed via a first antenna port associated with the FSA array, and participating in communication of a first signal via the first antenna port in accordance with the first type of operation.

An EH-capable device for wireless communications is described. The EH-capable device may include one or more memories storing processor executable code, and one or more processors coupled with the one or more memories. The one or more processors may individually or collectively be operable to execute the code to cause the EH-capable device to transmit a capability report that indicates a capability of the EH-capable device to use an FSA array at the EH-capable device, where the capability report indicates one or more modes supported by the EH-capable device in association with use of the FSA array, operate, in accordance with the capability of the EH-capable device, in a first mode of the one or more modes, where operation in the first mode includes a first type of operation performed via a first antenna port associated with the FSA array, and participate in communication of a first signal via the first antenna port in accordance with the first type of operation.

Another EH-capable device for wireless communications is described. The EH-capable device may include means for transmitting a capability report that indicates a capability of the EH-capable device to use an FSA array at the EH-capable device, where the capability report indicates one or more modes supported by the EH-capable device in association with use of the FSA array, means for operating, in accordance with the capability of the EH-capable device, in a first mode of the one or more modes, where operation in the first mode includes a first type of operation performed via a first antenna port associated with the FSA array, and means for participating in communication of a first signal via the first antenna port in accordance with the first type of operation.

A non-transitory computer-readable medium storing code for wireless communications is described. The code may include instructions executable by one or more processors to transmit a capability report that indicates a capability of the EH-capable device to use an FSA array at the EH-capable device, where the capability report indicates one or more modes supported by the EH-capable device in association with use of the FSA array, operate, in accordance with the capability of the EH-capable device, in a first mode of the one or more modes, where operation in the first mode includes a first type of operation performed via a first antenna port associated with the FSA array, and participate in communication of a first signal via the first antenna port in accordance with the first type of operation.

In some examples of the method, EH-capable devices, and non-transitory computer-readable medium described herein, the first mode may be a single-port EH mode and the first type of operation performed via the first antenna port associated with the FSA array may be an EH operation.

Some examples of the method, EH-capable devices, and non-transitory computer-readable medium described herein may further include operations, features, means, or instructions for participating in communication of a second signal via a second antenna port in accordance with a second type of operation, where the first mode includes the first type of operation performed via the first antenna port associated with the FSA array and, concurrently, the second type of operation performed via the second antenna port, which may be associated with the FSA array.

In some examples of the method, EH-capable devices, and non-transitory computer-readable medium described herein, the first signal may be associated with a first component carrier (CC) frequency and with a first spatial direction, and the second signal may be associated with a second CC frequency and with the first spatial direction.

In some examples of the method, EH-capable devices, and non-transitory computer-readable medium described herein, the first type of operation may be an EH operation and the second type of operation may be an EH operation, the first type of operation may be an EH operation and the second type of operation may be an uplink or backscattering operation, the first type of operation may be an EH operation and the second type of operation may be a downlink operation, and the first type of operation may be a downlink operation and the second type of operation may be an uplink operation.

Some examples of the method, EH-capable devices, and non-transitory computer-readable medium described herein may further include operations, features, means, or instructions for receiving a message indicating whether a reader wireless device supports the one or more modes of the EH-capable device, where participating in communication of the first signal may be based on the message indicating that the reader wireless device supports the first mode.

In some examples of the method, EH-capable devices, and non-transitory computer-readable medium described herein, individual ones of the one or more modes may be supported by a reader wireless device for corresponding time-frequency resources or procedures.

In some examples of the method, EH-capable devices, and non-transitory computer-readable medium described herein, the capability report indicates, for each mode of the one or more modes, a respective set of communication parameters supported by the EH-capable device for concurrently performing the first type of operation using the first antenna port and performing a second type of operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

In some examples of the method, EH-capable devices, and non-transitory computer-readable medium described herein, the capability report indicates a capability of the EH-capable device to switch from using the first mode to using a second mode of the one or more modes and the capability report indicates a duration associated with performing the switch.

Some examples of the method, EH-capable devices, and non-transitory computer-readable medium described herein may further include operations, features, means, or instructions for receiving a message indicating a set of multiple resource sets for transmission of a random access channel (RACH) message, selecting a first resource set from the set of multiple resource sets based on the capability report indicating at least the first mode, where the first resource set may be associated with the first mode based on a mapping between the one or more modes supported by the EH-capable device and the set of multiple resource sets, and transmitting the RACH message via the first resource set based on selecting the first resource set.

Some examples of the method, EH-capable devices, and non-transitory computer-readable medium described herein may further include operations, features, means, or instructions for receiving a first message indicating respective criteria associated with each mode of the one or more modes supported by the EH-capable device, selecting the first mode from the one or more modes based on first criteria associated with the first mode satisfying one or more threshold values, and transmitting a second message indicating the first mode based on selecting the first mode, where performance of the first type of operation may be in accordance with the first mode based on transmitting the second message.

In some examples of the method, EH-capable devices, and non-transitory computer-readable medium described herein, the respective criteria include an available energy at the EH-capable device, a channel quality measurement, a configured link budget, a self-interference value, an energy storage capability of the EH-capable device, or any combination thereof.

Some examples of the method, EH-capable devices, and non-transitory computer-readable medium described herein may further include operations, features, means, or instructions for transmitting a message including a request to use the first mode, where participating in communication of the first signal in accordance with the first type of operation may be based on transmitting the message.

Some examples of the method, EH-capable devices, and non-transitory computer-readable medium described herein may further include operations, features, means, or instructions for receiving a message indicating to use the first mode, where participating in communication of the first signal in accordance with the first type of operation may be based on receiving the message.

In some examples of the method, EH-capable devices, and non-transitory computer-readable medium described herein, the message indicates one or more time domain resources associated with the first mode, one or more frequency domain resources associated with the first mode, one or more spatial domain resources associated with the first mode, or any combination thereof.

In some examples of the method, EH-capable devices, and non-transitory computer-readable medium described herein, the message may be a downlink control information (DCI) message, a semi-persistently scheduled (SPS) message, a semi-static message, a periodic message, a message communicated based on an occurrence of an event, or any combination thereof.

In some examples of the method, EH-capable devices, and non-transitory computer-readable medium described herein, the capability of the EH-capable device to use the FSA array at the EH-capable device further includes a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

A method for wireless communications by a reader wireless device is described. The method may include receiving a capability report that indicates a capability of an EH-capable device to use an FSA array at the EH-capable device, where the capability report indicates one or more modes supported by the EH-capable device in association with use of the FSA array and participating in communication with the EH-capable device in accordance with a first mode indicated in the capability report, where the first mode is associated with at least a first type of operation at a first antenna port associated with the FSA array.

A reader wireless device for wireless communications is described. The reader wireless device may include one or more memories storing processor executable code, and one or more processors coupled with the one or more memories. The one or more processors may individually or collectively be operable to execute the code to cause the reader wireless device to receive a capability report that indicates a capability of an EH-capable device to use an FSA array at the EH-capable device, where the capability report indicates one or more modes supported by the EH-capable device in association with use of the FSA array and participate in communication with the EH-capable device in accordance with a first mode indicated in the capability report, where the first mode is associated with at least a first type of operation at a first antenna port associated with the FSA array.

Another reader wireless device for wireless communications is described. The reader wireless device may include means for receiving a capability report that indicates a capability of an EH-capable device to use an FSA array at the EH-capable device, where the capability report indicates one or more modes supported by the EH-capable device in association with use of the FSA array and means for participating in communication with the EH-capable device in accordance with a first mode indicated in the capability report, where the first mode is associated with at least a first type of operation at a first antenna port associated with the FSA array.

A non-transitory computer-readable medium storing code for wireless communications is described. The code may include instructions executable by one or more processors to receive a capability report that indicates a capability of an EH-capable device to use an FSA array at the EH-capable device, where the capability report indicates one or more modes supported by the EH-capable device in association with use of the FSA array and participate in communication with the EH-capable device in accordance with a first mode indicated in the capability report, where the first mode is associated with at least a first type of operation at a first antenna port associated with the FSA array.

In some examples of the method, reader wireless devices, and non-transitory computer-readable medium described herein, the first mode may be a single-port EH mode and the first type of operation may be an EH operation.

In some examples of the method, reader wireless devices, and non-transitory computer-readable medium described herein, the first mode includes the first type of operation performed at the first antenna port associated with the FSA array and, concurrently, a second type of operation performed at a second antenna port associated with the FSA array.

In some examples of the method, reader wireless devices, and non-transitory computer-readable medium described herein, participating in communication with the EH-capable device may include operations, features, means, or instructions for communicating a first signal associated with the first type of operation, where the first signal may be associated with a first CC frequency and with a first spatial direction and communicating a second signal associated with the second type of operation, where the second signal may be associated with a second CC frequency and with the first spatial direction.

In some examples of the method, reader wireless devices, and non-transitory computer-readable medium described herein, the first type of operation may be an EH operation and the second type of operation may be an EH operation, the first type of operation may be an EH operation and the second type of operation may be an uplink or backscattering operation, the first type of operation may be an EH operation and the second type of operation may be a downlink operation, and the first type of operation may be a downlink operation and the second type of operation may be an uplink operation.

Some examples of the method, reader wireless devices, and non-transitory computer-readable medium described herein may further include operations, features, means, or instructions for transmitting a message indicating whether the reader wireless device supports the one or more modes of the EH-capable device, where participating in communication with the EH-capable device may be based on the message indicating that the reader wireless device supports the first mode.

In some examples of the method, reader wireless devices, and non-transitory computer-readable medium described herein, individual ones of the one or more modes may be supported by the reader wireless device for corresponding time-frequency resources or procedures.

In some examples of the method, reader wireless devices, and non-transitory computer-readable medium described herein, the capability report indicates, for each mode of the one or more modes, a respective set of communication parameters supported by the EH-capable device for concurrently performing the first type of operation using the first antenna port and performing a type of second operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

In some examples of the method, reader wireless devices, and non-transitory computer-readable medium described herein, the capability report indicates a capability of the EH-capable device to switch from using the first mode to using a second mode of the one or more modes and the capability report indicates a duration associated with performing the switch.

Some examples of the method, reader wireless devices, and non-transitory computer-readable medium described herein may further include operations, features, means, or instructions for transmitting a message indicating a set of multiple resource sets for communicating a RACH message and receiving the RACH message via a first resource set of the set of multiple resource sets, where the first resource set may be associated with the first mode based on a mapping between the one or more modes supported by the EH-capable device and the set of multiple resource sets, and where receiving the random access message via the first resource set indicates a selection of the first mode by the EH-capable device.

Some examples of the method, reader wireless devices, and non-transitory computer-readable medium described herein may further include operations, features, means, or instructions for transmitting a first message indicating respective criteria associated with each mode of the one or more modes supported by the EH-capable device and receiving a second message indicating the first mode based on transmitting the first message, where the second message indicates a selection of the first mode by the EH-capable device based on first criteria associated with the first mode satisfying one or more threshold values.

In some examples of the method, reader wireless devices, and non-transitory computer-readable medium described herein, the respective criteria include an available energy at the EH-capable device, a channel quality measurement, a configured link budget, a self-interference value, an energy storage capability of the EH-capable device, or any combination thereof.

Some examples of the method, reader wireless devices, and non-transitory computer-readable medium described herein may further include operations, features, means, or instructions for receiving a message including a request to use the first mode, where participating in communication with the EH-capable device in accordance with the first type of operation may be based on receiving the message.

Some examples of the method, reader wireless devices, and non-transitory computer-readable medium described herein may further include operations, features, means, or instructions for transmitting a message indicating to use the first mode, where participating in communication with the EH-capable device in accordance with the first type of operation may be based on transmitting the message.

In some examples of the method, reader wireless devices, and non-transitory computer-readable medium described herein, the message indicates one or more time domain resources associated with the first mode, one or more frequency domain resources associated with the first mode, one or more spatial domain resources associated with the first mode, or any combination thereof.

In some examples of the method, reader wireless devices, and non-transitory computer-readable medium described herein, the message may be a DCI message, a SPS message, a semi-static message, a periodic message, a message communicated based on an occurrence of an event, or any combination thereof.

In some examples of the method, reader wireless devices, and non-transitory computer-readable medium described herein, the capability of the EH-capable device to use the FSA array at the EH-capable device further includes a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

BRIEF DESCRIPTION OF THE DRAWINGS

FIGS. 3A-3D show examples of signaling schemes that support ambient IoT operations with an FSA architecture in accordance with one or more aspects of the present disclosure.

DETAILED DESCRIPTION

Figure 1:
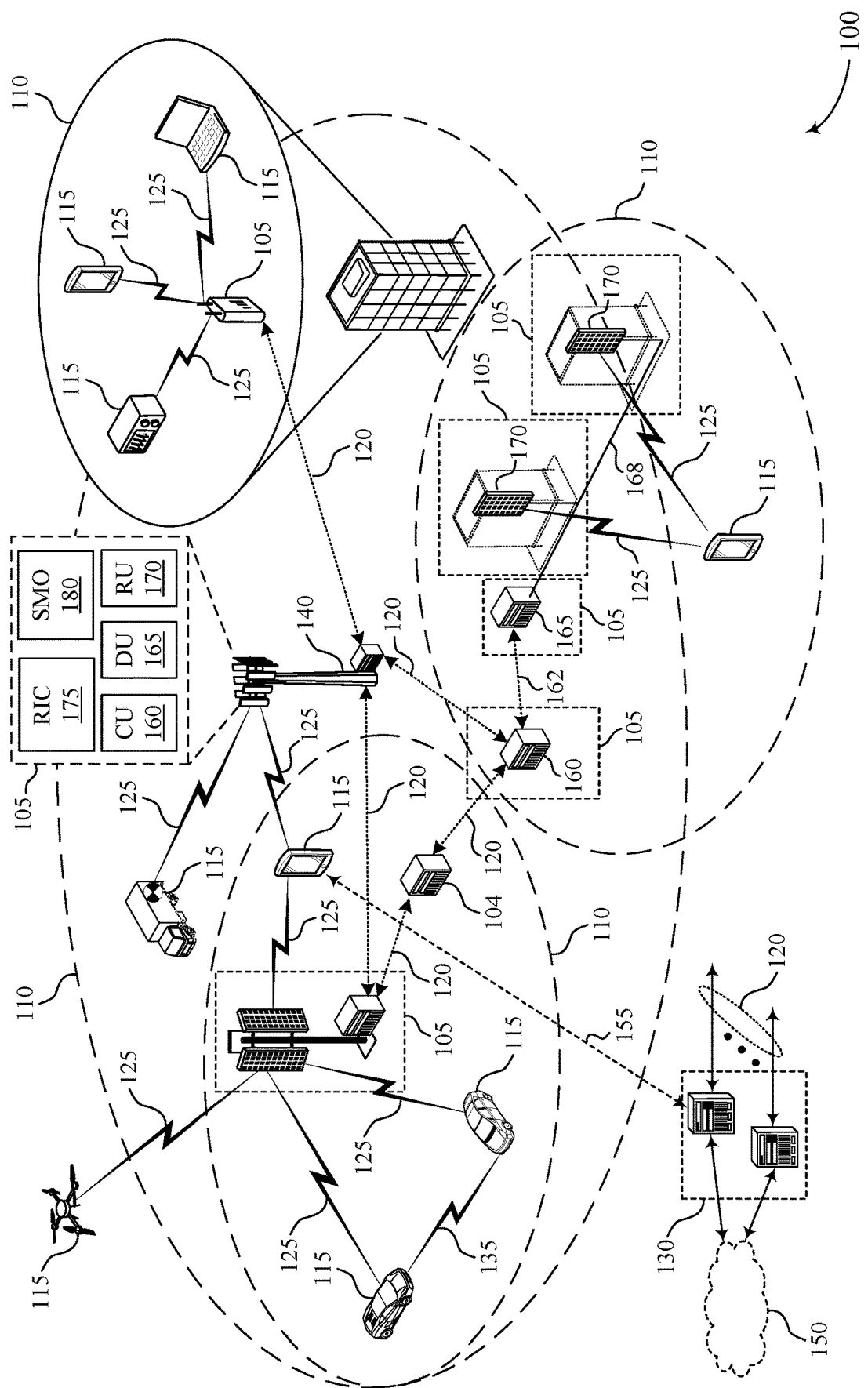
FIG. 1 shows an example of a wireless communications system that supports ambient internet-of-things (IoT) operations with a frequency scanning antenna (FSA) architecture in accordance with one or more aspects of the present disclosure.

In some wireless communications systems, an energy harvesting (EH)-capable device (e.g., an ambient internet-of-things (IoT) device, such as an IoT tag) may participate in communications with a reader wireless device (e.g., a user equipment (UE), a network entity, or another network node) via frequency bands associated with relatively high frequencies (e.g., millimeter wave frequencies). For example, the EH-capable device may communicate using beamformed communications, which may reduce isotropic path-loss associated with the high-frequency communications. In some cases, the EH-capable device may include a frequency scanning antenna (FSA) architecture to support such beamformed communications, which may be an example of a passive antenna structure that applies phase shifts between consecutive emitting elements (e.g., resulting in a spatial bias of a signal). Additionally, the EH-capable device may support performing operations using one or more antenna ports. For example, the FSA architecture may support the EH-capable device receiving a first signal and a second signal via similar spatial resources (e.g., overlapping beams) and different component carrier (CC) frequencies, which may be received using different antenna ports. The EH-capable device may be operable to perform operations in response to receiving a beamformed signal, such as reflecting an uplink signal. However, such techniques may limit a performance of the EH-capable device, such as when the EH-capable device is capable of performing simultaneous operations in a bimodal scheme (e.g., a full duplex mode) and is capable of switching between operational modes but is otherwise unable to notify the reader wireless device of such capabilities.

In some cases, an EH-capable device may transmit a capability report to a reader wireless device to indicate capabilities of the EH-capable device to use an FSA array (e.g., an architecture supporting beamformed communications at the EH-capable device). In some examples, the capability report may indicate one or more modes supported by the EH-capable device, where a mode may indicate one or more operations supported by the EH-capable device using one or more antenna ports associated with the FSA array. For example, the EH-capable device may indicate a capability to communicate using two different antenna ports and may indicate a capability to perform concurrent operations using the two different antenna ports. Such operations may include an EH operation (e.g., storing energy from a received signal), reflecting an uplink signal (e.g., backscattering a beamformed signal), receiving a downlink signal (e.g., attempting to decode data included in a signal), or any combination thereof. In some examples, the mode of the EH-capable device may indicate which operations are performable using each antenna port, and the EH-capable device may communicate with the reader wireless device to determine a mode for communications. For example, the reader wireless device may indicate modes supported by the reader wireless device, the EH-capable device may indicate a selected or recommended mode to the reader wireless device, or both. In some cases, the EH-capable device may be operable to switch from using a first mode to using a second mode (e.g., performing a different combination of one or more operations), and may indicate a capability to perform the switch and a duration (e.g., latency) associated with performing the switch. Such techniques may improve flexibility of the EH-capable device performing various operations using an FSA architecture and coordinating such operations with the reader wireless device, thereby improving performance of the EH-capable device.

Aspects of the disclosure are initially described in the context of wireless communications systems. Aspects of the disclosure are further illustrated by and described with reference to signaling schemes and a process flow. Aspects of the disclosure are further illustrated by and described with reference to apparatus diagrams, system diagrams, and flowcharts that relate to ambient IoT operations with an FSA architecture.

FIG. 1 shows an example of a wireless communications system 100 that supports ambient IoT operations with an FSA architecture in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link (s) 125 (e.g., one or more access links) using resources associated with one or more carriers. The term "carrier" may refer to a set of RF spectrum resources having a defined PHY layer structure for supporting the communication link (s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $Ts=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples of the wireless communications system 100, an EH-capable device (e.g., an ambient IoT device, such as an IoT tag) may communicate with a reader wireless device (e.g., an interrogator, a network entity 105, a UE 115, or another network node). For example, the EH-capable device may perform one or more operations in response to receiving a signal from the reader wireless device, such as harvesting energy from the signal (e.g., RF EH), backscattering a responsive signal (e.g., reflecting an uplink signal in response to receiving the signal), receiving data included in the signal (e.g., a relatively simple downlink reception scheme, such as on-off keying (OOK) and/or envelope tracking), or any combination thereof. In some examples, such communications may occur via frequency bands associated with relatively high frequencies (e.g., millimeter wave frequencies). In some cases, such frequencies may be associated with relatively higher isotropic path loss (e.g., degradation of the signal), and wireless devices may utilize beamformed communications to mitigate such path loss. However, some configurations that support beamformed communications (e.g., antenna architectures and signaling procedures) may be unsuitable for use by an EH-capable device. For example, such configurations may include phased antenna arrays (e.g., associated with relatively high power and resource costs) and one or more beam management procedures (e.g., associated with relatively high complexity and energy utilization), which the EH-capable device may be unable to support due to the EH-capable device being a relatively low complexity device.

In some examples, an EH-capable device may be operable to perform beamformed communications using an FSA architecture. For example, the EH-capable device may include a passive antenna structure including an array of emitting elements and may input a received signal to the array. As the signal propagates through the antenna structure, consecutive emitting elements may apply different phase shifts to the signal, which may result in a spatial bias of the signal (e.g., the signal may be emitted in a specific direction). In some examples, a quantity of phase shifts applied to an incident signal (e.g., influencing a direction of an emitted beam) may be related to a frequency of the incident signal. Accordingly, the EH-capable device may be capable of passively creating simultaneous frequency-specific beams emitted in different directions.

Additionally, in some examples, the EH-capable device may support an FSA architecture including multiple antenna ports. For example, the FSA architecture may include two antenna ports, and each antenna port may support a set of beams having similar spatial properties and spanning a frequency range in opposite directions (e.g., due to a symmetrical structure of the FSA architecture and reverse directions of signal propagation per antenna port). In such an example, the FSA architecture may include a quantity of emitting elements (e.g., N phase shifts), and the EH-capable device may receive a first signal using a first antenna port and may receive a second signal using a second antenna port. The EH-capable device may generate a first beam at a first frequency (e.g., a first CC) using the first antenna port by propagating the first signal through a first subset of the emitting elements (e.g., phase shifts 0 through k) and may generate a second beam at a second frequency (e.g., a second CC) using the second antenna port by propagating the second signal through a second subset of the emitting elements (e.g., phase shifts N−1 through k), where the first beam and the second beam may share similar spatial properties (e.g., overlapping beams communicated with different frequencies). In some cases, the EH-capable device may use the first beam and the second beam to participate in communications with the reader wireless device. Thus, the EH-capable device may be capable of communicating via multiple tones (e.g., the first CC and the second CC) associated with the same beamforming direction, which may support a higher order of modulation for downlink and uplink communications with the EH-capable device. In some examples, an EH-capable device including an FSA architecture may support performing simultaneous operations in a bimodal scheme (e.g., a full duplex mode) and may be capable of switching between operational modes (e.g., to perform different combinations of operations). However, the EH-capable device may be unable to notify the reader wireless device of such capabilities, which may limit a performance of the EH-capable device.

In some cases, an EH-capable device may transmit a capability report to a reader wireless device to indicate a capability of the EH-capable device to use an FSA array. The capability report may indicate one or more modes supported by the EH-capable device, where a mode may indicate one or more operations supported by the EH-capable device using one or more antenna ports. For example, the EH-capable device may indicate a capability to participate in communications (e.g., communicate a signal or perform an operation based on the signal) using two different antenna ports and may indicate a capability to perform concurrent operations using the two different antenna ports. Such operations may include an EH operation (e.g., storing energy from a received signal), reflecting an uplink signal (e.g., backscattering a beamformed signal), receiving a downlink signal (e.g., attempting to decode data included in a signal), or any combination thereof. In some examples, the mode of the EH-capable device may indicate which operations are performable using each antenna port, and the EH-capable device may communicate with the reader wireless device to determine a mode for communications. For example, the reader wireless device may indicate which modes are supported by the reader wireless device, the EH-capable device may indicate a selected or recommended mode to the reader wireless device, or both. In some cases, the EH-capable device may be operable to switch from using a first mode to using a second mode (e.g., performing a different combination of one or more operations), and may indicate a capability to perform the switch and a duration (e.g., latency) associated with performing the switch. Such techniques may improve flexibility of the EH-capable device performing various operations using an FSA architecture and coordinating such operations with the reader wireless device, thereby improving performance of the EH-capable device.

Figure 2:
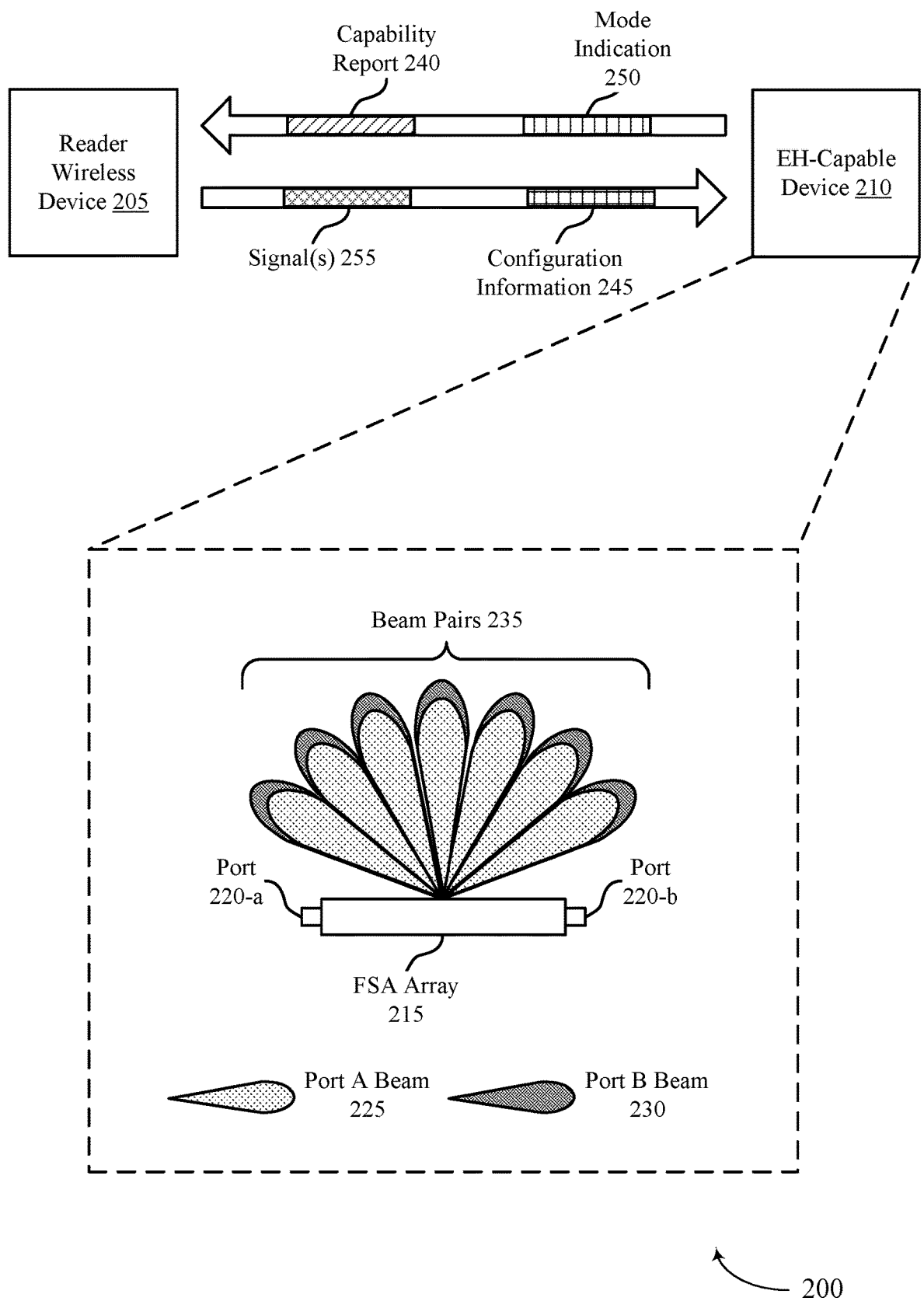
FIG. 2 shows an example of a wireless communications system that supports ambient IoT operations with an FSA architecture in accordance with one or more aspects of the present disclosure.

FIG. 2 shows an example of a wireless communications system 200 that supports ambient IoT operations with an FSA architecture in accordance with one or more aspects of the present disclosure. The wireless communications system 200 may implement, or be implemented by, one or more aspects of the wireless communications system 100. For example, the wireless communication system 200 may include a reader wireless device 205, which may be an example of a network entity 105 or a UE 115 described with reference to FIG. 1. Additionally, the wireless communications system 200 may include an EH-capable device 210, which may be an example of a UE 115 described with reference to FIG. 1. In some examples, the wireless communications system 200 may support the EH-capable device 210 communicating using an FSA architecture and reporting capabilities of the EH-capable device 210 associated with use of the FSA array 215.

In some cases, the EH-capable device 210 may include an FSA array 215, which may support the EH-capable device 210 communicating using beamformed communications. For example, the FSA array 215 may be an example of a passive antenna structure that applies phase shifts between consecutive emitting elements (e.g., resulting in a spatial bias of a signal). In some examples, the FSA array 215 may include one or more antenna ports 220, such as an antenna port 220-a and an antenna port 220-b. The EH-capable device 210 may use the one or more antenna ports 220 to perform one or more operations, such as an EH operation (e.g., storing energy obtained from a signal), reflecting an uplink signal (e.g., backscattering a received signal), receiving a downlink signal (e.g., attempting to decode data from a downlink signal), or any combination thereof. In some cases, such operations may be performed using beamformed communications, which the EH-capable device 210 may support based on the FSA array 215. For example, the EH-capable device 210 may be capable of emitting or receiving one or more port A beams 225 using the antenna port 220-a and may be capable of emitting or receiving one or more port B beams 230 using the antenna port 220-b.

In some cases, the port A beams 225 and the port B beams 230 may share similar spatial properties (e.g., beamforming directions) while being associated with different frequencies (e.g., CCs), which may result in the EH-capable device 210 supporting a set of beam pairs 235. For example, the port A beams 225 may span a set of CCs (e.g., $f_1$ through $f_7$) over a set of directional beams and the port B beams 230 may span the set of CCs over the set of directions beams in a reverse direction compared with the port A beams 225 (e.g., $f_7$ through $f_1$). In the example illustrated by the wireless communications system 200, the EH-capable device 210 may support a first beam pair 235 with a port A beam 225 at a first CC and a port B beam 230 at a seventh CC (e.g., $f_1$ and $f_7$), a second beam pair 235 with a port A beam 225 at a second CC and a port B beam 230 at a sixth CC (e.g., $f_2$ and $f_6$), a third beam pair 235 with a port A beam 225 at a third CC and a port B beam 230 at a fifth CC (e.g., $f_3$ and $f_5$), a fourth beam pair 235 with a port A beam 225 at a fourth CC and a port B beam 230 at the fourth CC (e.g., $f_4$ and $f_4$), a fifth beam pair 235 with a port A beam 225 at the fifth CC and a port B beam 230 at the third CC (e.g., $f_5$ and $f_3$), a sixth beam pair 235 with a port A beam 225 at the sixth CC and a port B beam 230 at the second CC (e.g., $f_6$ and $f_2$), and a seventh beam pair 235 with a port A beam 225 at the seventh CC and a port B beam 230 at the first CC (e.g., $f_7$ and $f_1$). Thus, each beam pair 235 may include a port A beam 225 and a port B beam 230 associated with a same beamforming direction and respective CCs (e.g., where a frequency separation between CCs may be based on a direction associated with communications). It should be noted that the EH-capable device 210 may support any quantity of beam pairs 235 or any quantity of antenna ports 220, and is not limited to examples illustrated and described herein.

In some examples, the EH-capable device 210 may support one or more modes of operation, where a mode may indicate one or more operations performable by the EH-capable device 210 using the FSA array 215. As an example, a mode of operation may be associated with the EH-capable device 210 performing a single-port operation, such as an EH operation (e.g., harvesting energy from a beamformed signal using a single antenna port 220 of the FSA array 215). As another example, the mode of operation may be associated with the EH-capable device 210 performing operations, concurrently, using multiple antenna ports 220, such as multiple EH operations (e.g., beamformed EH may occur using one or more multiple antenna ports 220 of the FSA array 215). Additionally, or alternatively, the mode of the EH-capable device 210 may indicate various types of operations performed via one or more antenna ports 220 of the FSA array 215. For example, in a dual-port scenario (e.g., as illustrated by FIG. 2), a mode may indicate a first type of operation performed via the port 220-a and a second type of operation performed via the port 220-b (as described with greater detail with reference to FIGS. 3A through 3D). As described herein, the first type of operation may be an EH operation and the second type of operation may be an EH operation (e.g., a first mode), or the first type of operation may be an EH operation and the second type of operation may be an uplink or backscattering operation (e.g., a second mode), or the first type of operation may be an EH operation and the second type of operation may be a downlink operation (e.g., a third mode), or the first type of operation may be a downlink operation and the second type of operation may be an uplink or backscattering operation (e.g., a fourth mode).

In some cases, the EH-capable device 210 and the reader wireless device 205 may communicate signaling to coordinate modes of the EH-capable device 210 supported for subsequent communications. For example, the EH-capable device 210 may transmit a capability report 240 to the reader wireless device 205 indicating a capability of the EH-capable device 210 to use the FSA array 215. The capability report 240 may indicate a capability or class associated with the FSA array 215 and EH capabilities of the EH-capable device 210 (e.g., spatial-spectral EH capabilities). For example, the capability report 240 may include (half-power) beamwidth and bandwidth supported by the EH-capable device 210 (e.g., a common value for a range of frequencies or a set of values associated with different carrier frequencies, such as when a response is not uniform within an operating frequency), a set of operation frequency resources supported by the EH-capable device 210 (e.g., a bandwidth or range of operation frequencies), an angular beamforming range supported by the EH-capable device 210, a gain level supported by the EH-capable device 210, an energy storage status of the EH-capable device 210, an EH efficiency of the EH-capable device 210, or any combination thereof. In some examples, the capability report 240 may indicate which modes are supported by the EH-capable device 210 (e.g., each of the modes or a subset of the modes).

In some cases, such as when the EH-capable device 210 supports multiple modes of operation, the capability report 240 may indicate a capability of the EH-capable device 210 to switch between using modes (e.g., switch from using a first mode to using a second mode) and may indicate a duration (e.g., latency) associated with performing the switch. In some examples, the EH-capable device 210 may support performing a switch between modes dynamically (e.g., in response to a trigger or command to perform the switch), semi-statically (e.g., according to preconfigured scheduling), or both. In some cases, the capability report 240 may indicate communication parameters associated with each mode supported by the EH-capable device 210. The communication parameters may be associated with the EH-capable device 210 concurrently performing a first type of operation using the antenna port 220-a and performing a second type of operation using the antenna port 220-b in accordance with a corresponding mode. For example, the communication parameters may indicate, for a corresponding mode, frequency resources associated with the first type of operation and the second type of operation, angular beamforming directions associated with the first type of operation and the second type of operation, or any combination thereof. In some examples, the communication parameters may indicate which types of operations are supported for various beam pairs 235. For example, the EH-capable device 210 may be unable to support a full-duplex mode of operation via a beam pair 235 having relatively low frequency separation (e.g., the center beam pair 235 having each beam at $f_4$), and may indicate that such a beam pair 235 is unsuitable for the full-duplex mode in the capability report 240.

In some examples, the EH-capable device 210 may identify one or more modes of operation supported by the EH-capable device 210 for communications and may indicate the one or more modes to the reader wireless device 205. For example, the EH-capable device 210 may indicate the one or more modes in the capability report 240 (e.g., upon association with the reader wireless device 205). As another example, the reader wireless device 205 may indicate multiple resource sets associated with a RACH procedure and a mapping between the multiple resource sets and the one or more modes supported by the EH-capable device 210. In such examples, the EH-capable device 210 may select a first resource set associated with a first mode (e.g., a mode preferred by the EH-capable device 210) and may transmit a RACH message via the first resource set to indicate the selection of the first mode. In some cases, the reader wireless device 205 may identify the selection of the first mode based on receiving the RACH message via the first resource set.

In some examples, the EH-capable device 210 may receive configuration information 245 (e.g., from the reader wireless device 205 or another network device). The reader wireless device 205 may transmit the configuration information 245 based on receiving the capability report 240 or prior to receiving the capability report 240. In some cases, the configuration information 245 may indicate one or more modes of the EH-capable device 210 supported by the reader wireless device 205. For example, the configuration information 245 may indicate that the reader wireless device 205 supports each mode of the EH-capable device 210 (e.g., the reader wireless device 205 may support all four modes of the EH-capable device 210). Alternatively, the configuration information 245 may indicate that the reader wireless device 205 supports a subset of modes of the EH-capable device 210, where access to EH-capable devices 210 using an unsupported mode may be barred (e.g., the reader wireless device 205 and EH-capable device 210 may adhere to an access control policy). For example, if the EH-capable device 210 identifies, in the configuration information 245, that the reader wireless device 205 does not support a mode used by the EH-capable device 210, the EH-capable device 210 may refrain from establishing a connection with the reader wireless device 205. In some cases, the configuration information 245 may indicate respective time-frequency resources, respective configurations for various procedures (e.g., random access channel (RACH) procedures, beam management procedures, or the like), or both for serving different classes or modes of the EH-capable device 210.

In some examples, the EH-capable device 210 and the reader wireless device 205 may communicate signaling to select or switch between modes of the EH-capable device 210. For example, the EH-capable device 210 may select or recommend a mode and may transmit a mode indication 250 (e.g., which may be part of the capability report 240 or transmitted in a separate message) indicating the selected or recommended mode. In some cases, the EH-capable device 210 may identify the mode based on criteria associated with each mode of the EH-capable device 210. For example, the reader wireless device 205 may transmit a message indicating respective criteria associated with the one or more modes supported by the EH-capable device 210 and the EH-capable device 210 may select a first mode from the one or more modes based on first criteria associated with the first mode satisfying one or more threshold value. Such criteria may include an available energy at the EH-capable device 210 (e.g., an energy storage status), a channel quality measurement (e.g., if the EH-capable device 210 is capable of channel measurement), a configured link budget, a self-interference value (which may be beam-specific), an energy storage capability of the EH-capable device 210, or any combination thereof. If the EH-capable device 210 identifies that the first criteria satisfies the threshold values, the EH-capable device 210 may indicate the first mode in the mode indication 250 (e.g., indicating a selection of the first mode or a request recommending to use the first mode). In some examples, a measurement configuration and/or reporting configuration of the EH-capable device 210 may be based on the mode of the EH-capable device 210 (e.g., mode-specific measurement and report configurations). Additionally, or alternatively, the reader wireless device 205 may indicate a selected mode for the EH-capable device 210 to use for communications (e.g., based on satisfaction of corresponding criteria). For example, the reader wireless device 205 may indicate the selected mode in the configuration information 245 or via a different control message.

In some cases, an indication of a selected or recommended mode (e.g., by the reader wireless device 205 or the EH-capable device 210) may include resources associated with the mode. For example, the indication may include one or more time domain resources associated with the mode, one or more frequency domain resources associated with the mode, one or more spatial domain resources associated with the mode, or any combination thereof. Additionally, the indication of a selected or recommended mode may be communicated via a dynamic message, a semi-persistent message, a semi-static message, a periodic message, an event-triggered message, or any combination thereof.

In some examples, the EH-capable device 210 may participate in communication of one or more signals 255 with the reader wireless device 205. In some cases, the one or more signals 255 may be communicated in accordance with a mode of the EH-capable device 210 (e.g., as described in greater detail with reference to FIGS. 3A through 3D). For example, the reader wireless device 205 and the EH-capable device 210 may determine to use a first mode of the EH-capable device 210 (e.g., based on communicating the capability report 240, the configuration information 245, the mode indication 250, or any combination thereof) associated with one or more types of operations using the antenna ports 220 of the FSA array 215. As an example, the first mode may be associated with single-port operations at the EH-capable device 210, and the one or more signals 255 may include a first signal associated with performing a first type of operation via the antenna port 220-a. As another example, the first mode may be associated with multi-port operations at the EH-capable device 210, and the one or more signals 255 may include the first signal and a second signal associated with performing a second type of operation via the antenna port 220-b (e.g., concurrently with performing the first operation via the antenna port 220-a).

Such techniques may improve flexibility of the EH-capable device 210 performing various operations using the FSA array 215 and coordinating a mode associated with such operations with the reader wireless device 205, thereby improving performance of the EH-capable device 210 associated with use of the FSA array 215.

FIGS. 3A-3D show examples of signaling schemes 301-304 that support ambient IoT operations with an FSA architecture in accordance with one or more aspects of the present disclosure. The signaling schemes 301-304 may implement, or be implemented by, one or more aspects of the wireless communications systems 100 and 200. For example, the signaling schemes 301-304 show examples of various modes which an EH-capable device may operate according to in order to participate in communications with a reader wireless device, which may be examples of corresponding devices and aspects described with reference to FIGS. 1 and 2. Additionally, the signaling schemes 301-304 may support the EH-capable device performing various types of operations using one or more antenna ports of an FSA array 305 according to a mode 310, which may be an example of an FSA array 215 described with reference to FIG. 2. For example, the EH-capable device may use one or more antenna ports 315 (e.g., an antenna port 315-a and an antenna port 315-b) to participate in communication of one or more signals 320 with the reader wireless device, which may include the EH-capable device performing one or more operations 325. It should be noted that while the signaling schemes 301-304 illustrate examples of the EH-capable device performing two operations 325 via two antenna ports 315, the EH-capable device may perform any quantity of operations 325 via any quantity of antenna ports 315.

In the examples illustrated by the signaling schemes 301-304, the one or more signals 320 may include respective signals associated with each antenna port 315 of the FSA array 305. For example, the one or more signals 320 may include a port A signal 330 to be received by the EH-capable device using the antenna port 315-a and may include a port B signal 335 to be received by the EH-capable device using the antenna port 315-b. In some cases, the EH-capable device may receive the port A signal 330 using a port A beam 340 and may receive the port B signal 335 using a port B beam 345, where the port A beam 340 and the port B beam 345 may share similar spatial properties and may have different frequency properties (e.g., a beam pair 235 described with reference to FIG. 2). For example, the port A beam 340 may be associated with a first CC (e.g., $f_6$) and the port B beam 345 may be associated with a second CC (e.g., $f_2$), thereby achieving frequency diversity while sharing spatial properties (e.g., overlapping beams). In some cases, the beams that are used to participate in communication of the one or more signals 320 may be associated with the types of the operations 325 (e.g., some types of operations 325 may be opportunistic based on an incident direction of the one or more signals 320). For example, a position of the reader wireless device relative to the EH-capable device may determine a frequency separation between the port A beam 340 and the port B beam 345.

The signaling scheme 301 illustrates a first example of an EH-capable device participating in communication of the one or more signals 320 with a reader wireless device using an FSA array 305. In some examples, the EH-capable device may participate in the communication of the one or more signals 320 in accordance with a mode 310-a (e.g., a first mode), which may indicate a first type of an operation 325-a associated with the antenna port 315-a and a second type of an operation 325-b associated with the antenna port 315-b. For example, the mode 310-a may indicate that the first type of operation is an EH operation (e.g., the operation 325-a is an EH operation) and that the second type of operation is an EH operation (e.g., the operation 325-b is an EH operation). In some examples, the reader wireless device may transmit the one or more signals 320 to the EH-capable device in accordance with the types of the operations 325. For example, each of the port A signal 330 and the port B signal 335 may be continuous waveform signals (e.g., enabling the EH-capable device to harvest energy from the received signals). The EH-capable device may perform the operation 325-a using the antenna port 315-a (e.g., harvesting energy from the continuous waveform port A signal 330) and may perform the operation 325-b, concurrent with performing the operation 325-*a*, using the antenna port 315-*b* (e.g., harvesting energy from the continuous waveform port B signal 335).

The signaling scheme 302 illustrates a second example of an EH-capable device participating in communication of the one or more signals 320 with a reader wireless device using an FSA array 305. In some examples, the EH-capable device may participate in the communication of the one or more signals 320 in accordance with a mode 310-*b* (e.g., a second mode), which may indicate a first type of an operation 325-*a* associated with the antenna port 315-*a* and a second type of an operation 325-*b* associated with the antenna port 315-*b*. For example, the mode 310-*b* may indicate that the first type of operation is an EH operation (e.g., the operation 325-*a* is an EH operation) and that the second type of operation is an uplink backscattering operation (e.g., the operation 325-*b* is an uplink backscattering operation). In some examples, the reader wireless device may transmit the one or more signals 320 to the EH-capable device in accordance with the types of the operations 325. For example, each of the port A signal 330 and the port B signal 335 may be continuous waveform signals (e.g., enabling the EH-capable device to harvest energy from or reflect portions of the received signals). In some cases, the EH-capable device may perform the operation 325-*a* using the antenna port 315-*a* (e.g., harvesting energy from the continuous waveform port A signal 330). Additionally, the EH-capable device may perform the operation 325-*b*, concurrent with performing the operation 325-*a*, using the antenna port 315-*b*. For example, the operation 325-*b* may include the EH-capable device receiving the continuous waveform port B signal 335 and backscattering a modulated port B signal 335 signal (e.g., digitally modulated, such as by an OOK modulation scheme) by reflecting portions of the continuous waveform port B signal 335 (e.g., communicating an uplink signal back to the reader wireless device).

The signaling scheme 303 illustrates a third example of an EH-capable device participating in communication of the one or more signals 320 with a reader wireless device using an FSA array 305. In some examples, the EH-capable device may participate in the communication of the one or more signals 320 in accordance with a mode 310-*c* (e.g., a third mode), which may indicate a first type of an operation 325-*a* associated with the antenna port 315-*a* and a second type of an operation 325-*b* associated with the antenna port 315-*b*. For example, the mode 310-*c* may indicate that the first type of operation is an EH operation (e.g., the operation 325-*a* is an EH operation) and that the second type of operation is a downlink reception operation (e.g., the operation 325-*b* is a downlink reception operation). In some examples, the reader wireless device may transmit the one or more signals 320 to the EH-capable device in accordance with the types of the operations 325. For example, the port A signal 330 may be a continuous waveform signal (e.g., enabling the EH-capable device to harvest energy via the antenna port 315-*a*) and the port B signal 335 may be a digitally-modulated signal (e.g., enabling the EH-capable device to receive data via the antenna port 315-*b*). In some cases, the EH-capable device may perform the operation 325-*a* using the antenna port 315-*a* (e.g., harvesting energy from the continuous waveform port A signal 330). Additionally, the EH-capable device may perform the operation 325-*b*, concurrent with performing the operation 325-*a*, using the antenna port 315-*b*. For example, the operation 325-*b* may include the EH-capable device receiving the digitally-modulated port B signal 335 (e.g., modulated to convey information, such as via a sequence of bits) and attempting to decode data included in the port B signal 335. In some examples, the EH-capable device may receive the digitally-modulated port B signal 335 using envelope tracking and an OOK modulation scheme (e.g., a relatively simple reception scheme).

The signaling scheme 304 illustrates a fourth example of an EH-capable device participating in communication of the one or more signals 320 with a reader wireless device using an FSA array 305. In some examples, the EH-capable device may participate in the communication of the one or more signals 320 in accordance with a mode 310-*d* (e.g., a fourth mode), which may indicate a first type of an operation 325-*a* associated with the antenna port 315-*a* and a second type of an operation 325-*b* associated with the antenna port 315-*b*. For example, the mode 310-*d* may indicate that the first type of operation is a downlink reception operation (e.g., the operation 325-*a* is a downlink reception operation) and that the second type of operation is an uplink backscattering operation (e.g., the operation 325-*b* is an uplink backscattering operation). In some examples, the reader wireless device may transmit the one or more signals 320 to the EH-capable device in accordance with the types of the operations 325. For example, the port A signal 330 may be a digitally-modulated signal (e.g., enabling the EH-capable device to receive data via the antenna port 315-*a*) and the port B signal 335 may be a continuous waveform signal (e.g., enabling the EH-capable device to reflect portions of the port B signal 335 back to the reader wireless device). In some cases, the signaling scheme 304 may be an example of the EH-capable device performing full-duplex operations (e.g., communicating in a bimodal scheme). For example, the EH-capable device may perform the operation 325-*a* to receive downlink data from the digitally-modulated port A signal 330 and may perform the operation 325-*b*, concurrent with performing the operation 325-*a*, to transmit uplink data by reflecting portions of the continuous waveform port B signal 335. In some cases, performing such bimodal operations may depend on frequencies associated with the port A beam 340 and the port B beam 345 used to receive the port A signal 330 and the port B signal 335, respectively. For example, if the port A beam 340 and the port B beam 345 are associated with relatively similar CCs (e.g., the center beam pair where each beam may be associated with $f_4$), performing simultaneous uplink and downlink operations may incur relatively high self-interference at the EH-capable device. Thus, operating according to the mode 310-*d* may be opportunistic, such as when the reader wireless device is located in a position (e.g., relative to the EH-capable device) that enables communications via beams with relatively high frequency separation.

Figure 4:
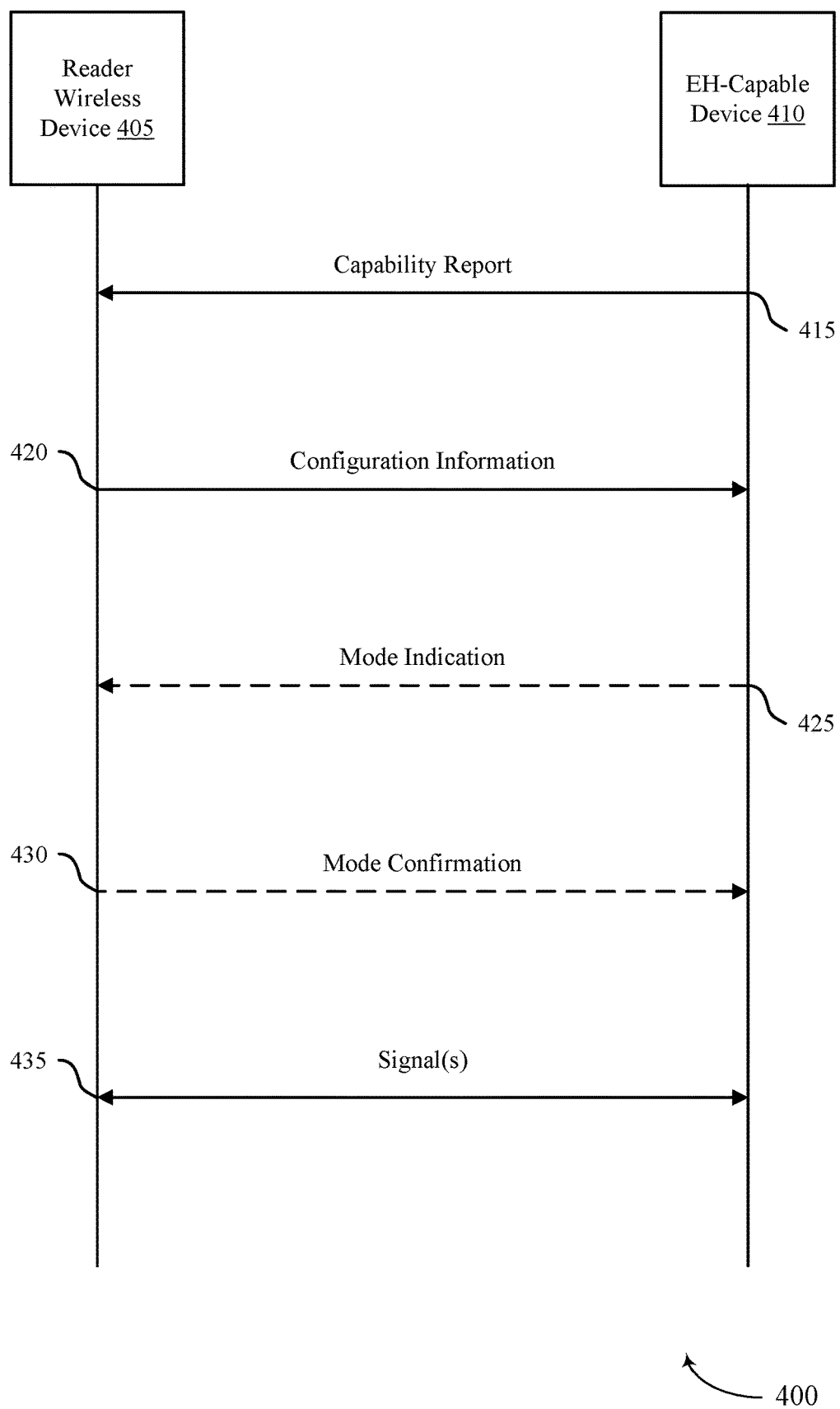
FIG. 4 shows an example of a process flow that supports ambient IoT operations with an FSA architecture in accordance with one or more aspects of the present disclosure.

FIG. 4 shows an example of a process flow 400 that supports ambient IoT operations with an FSA architecture in accordance with one or more aspects of the present disclosure. The process flow 400 may implement, or be implemented by, one or more aspects of the wireless communications systems 100 and 200, as well as the signaling schemes 301-304. For example, the process flow 400 may show examples of signaling between a reader wireless device 405 and an EH-capable device 410, which may be examples of corresponding devices described with reference to FIGS. 1-3. In some cases, the process flow 400 may support the EH-capable device 410 indicating, to the reader wireless device 405 via a capability report, capabilities of the EH-capable device 410 to use an FSA array according to one or more modes, which may be examples of corresponding aspects described with reference to FIGS. 2 and 3. Alternative examples of the following may be implemented, where some processes are performed in a different order than described or are not performed. In some cases, processes may include additional features not mentioned below, or further processes may be added.

At 415, the EH-capable device 410 may transmit a capability report to the reader wireless device 405. The capability report may indicate a capability of the EH-capable device 410 to use an FSA array at the EH-capable device 410. For example, the capability of the EH-capable device 410 to use the FSA array may include a beamwidth supported by the EH-capable device 410, a bandwidth supported by the EH-capable device 410, a set of operational frequency resources supported by the EH-capable device 410, an angular beamforming range supported by the EH-capable device 410, a gain level associated with the EH-capable device 410, an energy storage status of the EH-capable device 410, an energy conversion efficiency of the EH-capable device 410, or any combination thereof.

In some cases, the capability report may indicate one or more modes supported by the EH-capable device 410 in association with use of the FSA array. A mode may indicate one or more types of one or more operations performed via one or more antenna ports associated with the FSA array. For example, a first mode of the one or more modes may include a first type of operation performed via a first antenna port associated with the FSA array. In some cases, the first mode may be a single-port EH mode, and the first type of operation performed via the first antenna port associated with the FSA array may be an EH operation. Alternatively, the first mode may indicate types of multiple operations performed via multiple antenna ports of the FSA array. For example, the first mode may include the first type of operation performed via the first antenna port and a second type of operation performed via a second antenna port associated with the FSA array. In such examples, the first type of operation may be an EH operation and the second type of operation may be an EH operation, or the first type of operation may be an EH operation and the second type of operation may be an uplink or backscattering operation, or the first type of operation may be an EH operation and the second type of operation may be a downlink operation, or the first type of operation may be a downlink operation and the second type of operation may be an uplink or backscattering operation.

Additionally, or alternatively, the capability report may indicate, for each mode of the one or more modes, a respective set of communication parameters supported by the EH-capable device 410 for concurrently performing the first type of operation using the first antenna port and performing the second type of operation using the second antenna port in accordance with a corresponding mode of the one or more modes. For example, the respective set of communication parameters may indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode. In some examples, the capability report may indicate a capability of the EH-capable device 410 to switch from using the first mode to using a second mode of the one or more modes, and the capability report may indicate a duration (e.g., latency) associated with performing the switch.

At 420, the reader wireless device 405 may transmit, to the EH-capable device 410, configuration information associated with communicating in accordance with the one or more modes of the EH-capable device 410. For example, the reader wireless device 405 may transmit a message indicating whether the reader wireless device 405 supports the one or more modes of the EH-capable device 410. In some cases, the reader wireless device 405 may support individual ones of the one or more modes for corresponding time-frequency resources of procedures (e.g., different resources or configurations, such as for RACH or beam management procedures, for serving different classes or modes of the EH-capable device 410). Additionally, or alternatively, the reader wireless device 405 may transmit a message indicating multiple resource sets of transmission of a RACH message. In some examples, the reader wireless device 405 may configure a mapping between the one or more modes supported by the EH-capable device 410 and the multiple resource sets such that the EH-capable device 410 may select a mode by communicating a RACH message via a corresponding resource set. Additionally, or alternatively, the reader wireless device 405 may transmit a message indicating respective criteria associated with each mode of the one or more modes supported by the EH-capable device 410, such that the EH-capable device 410 may select a mode based on corresponding criteria being satisfied. In some cases, the respective criteria may include an available energy at the EH-capable device 410, a channel quality measurement, a configured link budget, a self-interference value, an energy storage capability of the EH-capable device 410, or any combination thereof.

At 425, the EH-capable device 410 may transmit a mode indication message to the reader wireless device 405. For example, if the EH-capable device 410 receives the message indicating the multiple resource sets of transmission of the RACH message that are mapped to the one or more modes, the EH-capable device 410 may select a first resource set from the multiple resources sets associated with a first mode based on the capability report indicating at least the first mode. In such examples, the EH-capable device 410 may transmit the mode indication as a RACH message via the first resource set to indicate the selection of the first mode. Additionally, or alternatively, if the EH-capable device 410 receives the respective criteria associated with each mode of the one or more modes, the EH-capable device 410 may select the first mode based on first criteria associated with the first mode satisfying one or more threshold values. In such examples, the EH-capable device 410 may transmit the mode indication as a message indicating the selection of the first mode. In some cases, the EH-capable device 410 may transmit the mode indication as a message requesting to use the first mode (e.g., recommending the first mode to the reader wireless device 405).

At 430, the reader wireless device 405 may transmit a mode confirmation message to the EH-capable device 410. For example, the EH-capable device 410 may receive the mode confirmation message indicating the use the first mode. In some examples, the mode confirmation message may be communicated in response to a request to use the first mode, or may be transmitted independent of communications from the EH-capable device 410. For example, the message may be an example of a DCI message, a SPS message, a semi-static message, a periodic message, a message communicated based on an occurrence of an event, or any combination thereof. In some cases, the message may indicate one or more time domain resources associated with the first mode, one or more frequency domain resources associated with the first mode, one or more spatial domain resource associated with the first mode, or any combination thereof.

At 435, the EH-capable device 410 may participate in communication of one or more signals with the reader wireless device 405 via the one or more antenna ports associated with the FSA array. For example, the EH-capable device 410 may participate in the communication of the one or more modes based on operating in the first mode of the one or more modes (e.g., indicating a first type of operation performed via the first antenna port, a second type of operation performed via the second antenna port, or both). As an example, the EH-capable device 410 may participate in communication of a first signal via the first antenna port in accordance with the first type of operation. Additionally, the EH-capable device 410 may participate in communication of a second signal, at least partially concurrent with participating in communication of the first signal, via the second antenna port in accordance with the second type of operation. As described herein, participation in communication of a signal in accordance with a type of operation may include harvesting energy from a signal (e.g., an EH operation), reflecting an uplink signal (e.g., an uplink backscattering operation), receiving a downlink signal (e.g., decoding data from a signal), or any combination thereof. In some examples, the one or more signals may be communicated using beamformed communications. For example, the first signal may be associated with a first CC frequency and with a first spatial direction, and the second signal may be associated with a second CC frequency and with the first spatial direction (e.g., the EH-capable device 410 may receive signals via overlapping beams associated with different frequencies).

Such techniques may improve flexibility of the EH-capable device 410 performing various operations using the FSA array and coordinating a mode associated with such operations with the reader wireless device 405, thereby improving performance of the EH-capable device 410 associated with use of the FSA array.

Figure 5:
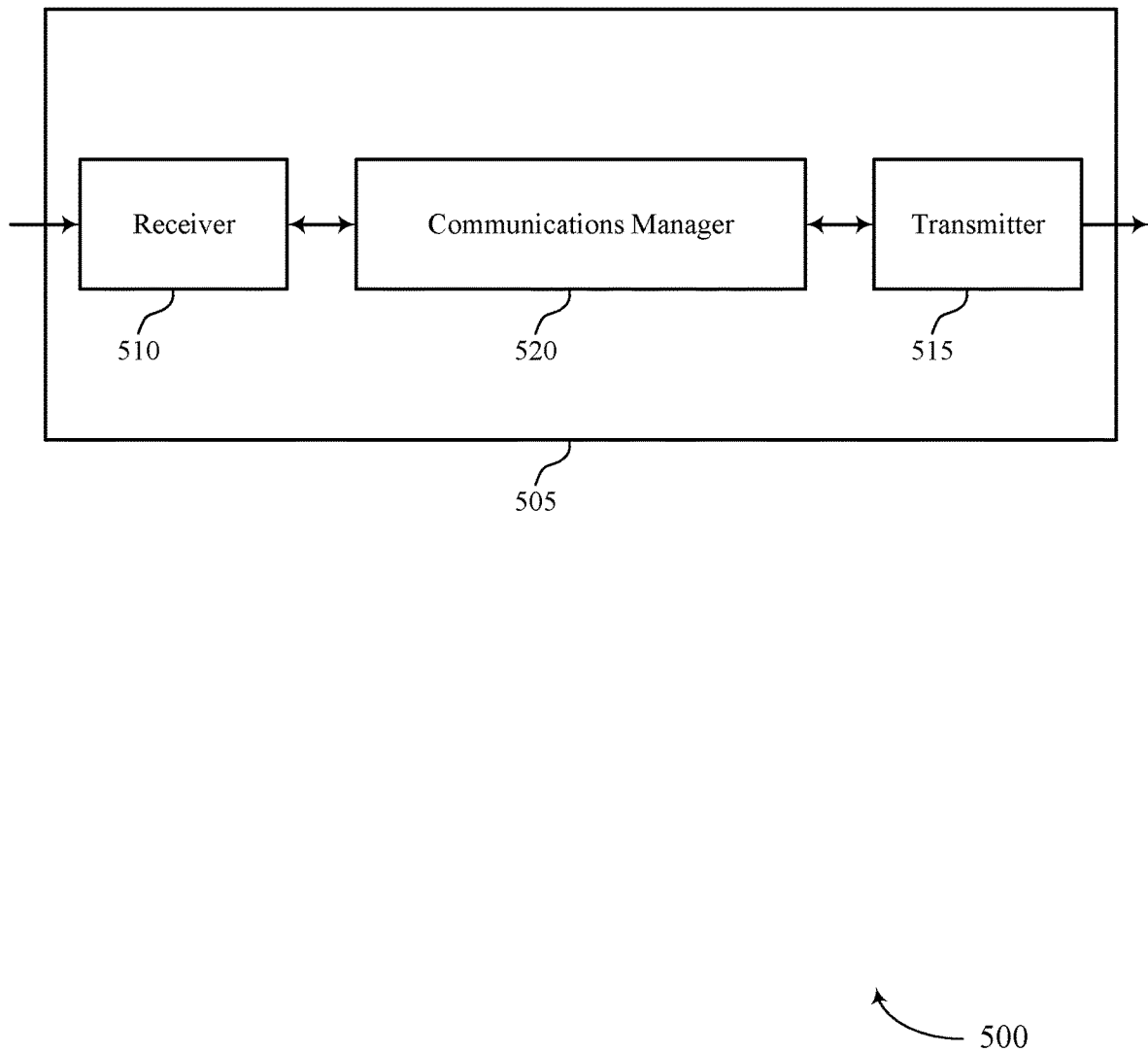
FIGS. 5 and 6 show block diagrams of devices that support ambient IoT operations with an FSA architecture in accordance with one or more aspects of the present disclosure.

FIG. 5 shows a block diagram 500 of a device 505 that supports ambient IoT operations with an FSA architecture in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to ambient IoT operations with an FSA architecture). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to ambient IoT operations with an FSA architecture). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of ambient IoT operations with an FSA architecture as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting a capability report that indicates a capability of the EH-capable device to use an FSA array at the EH-capable device, where the capability report indicates one or more modes supported by the EH-capable device in association with use of the FSA array. The communications manager 520 is capable of, configured to, or operable to support a means for operating, in accordance with the capability of the EH-capable device, in a first mode of the one or more modes, where operation in the first mode includes a first type of operation performed via a first antenna port associated with the FSA array. The communications manager 520 is capable of, configured to, or operable to support a means for participating in communication of a first signal via the first antenna port in accordance with the first type of operation.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for enhanced operations by an EH-capable device, which may include performing one or more concurrent operations using one or more antenna ports of an FSA array, thereby improving performance of the EH-capable device.

Figure 6:
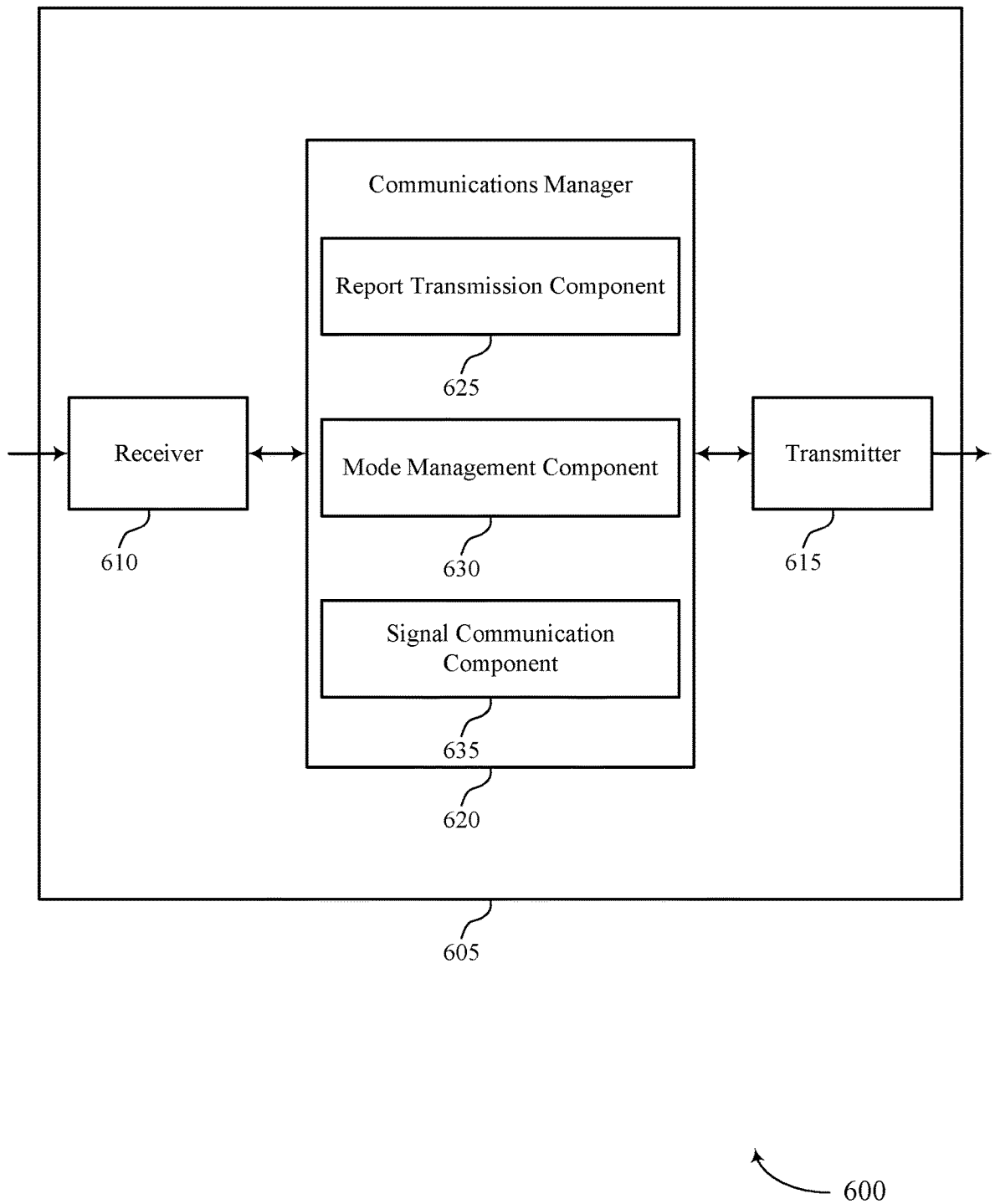

FIG. 6 shows a block diagram 600 of a device 605 that supports ambient IoT operations with an FSA architecture in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to ambient IoT operations with an FSA architecture). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to ambient IoT operations with an FSA architecture). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of ambient IoT operations with an FSA architecture as described herein. For example, the communications manager 620 may include a report transmission component 625, a mode management component 630, a signal communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The report transmission component 625 is capable of, configured to, or operable to support a means for transmitting a capability report that indicates a capability of the EH-capable device to use an FSA array at the EH-capable device, where the capability report indicates one or more modes supported by the EH-capable device in association with use of the FSA array. The mode management component 630 is capable of, configured to, or operable to support a means for operating, in accordance with the capability of the EH-capable device, in a first mode of the one or more modes, where operation in the first mode includes a first type of operation performed via a first antenna port associated with the FSA array. The signal communication component 635 is capable of, configured to, or operable to support a means for participating in communication of a first signal via the first antenna port in accordance with the first type of operation.

Figure 7:
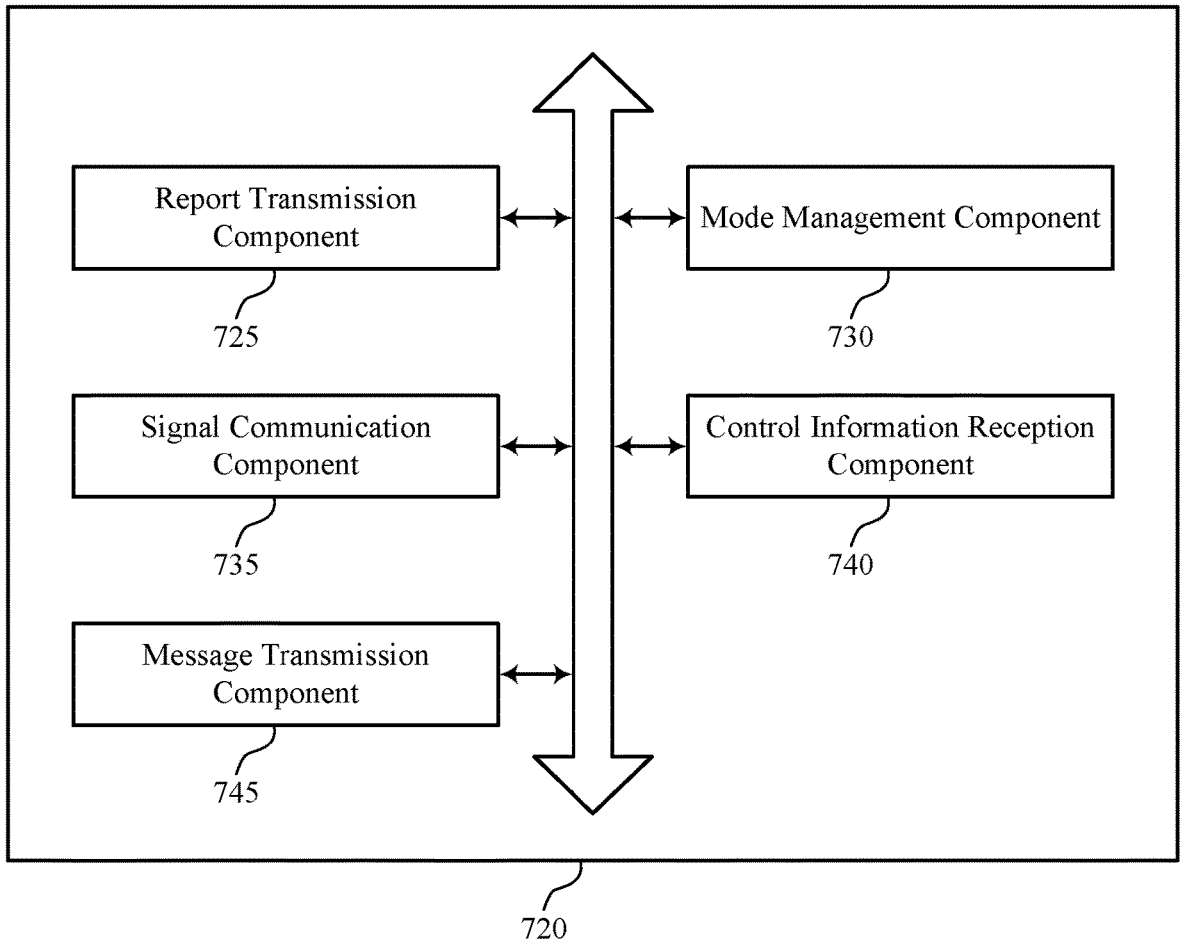
FIG. 7 shows a block diagram of a communications manager that supports ambient IoT operations with an FSA architecture in accordance with one or more aspects of the present disclosure.

FIG. 7 shows a block diagram 700 of a communications manager 720 that supports ambient IoT operations with an FSA architecture in accordance with one or more aspects of the present disclosure. The communications manager 720 may be an example of aspects of a communications manager 520, a communications manager 620, or both, as described herein. The communications manager 720, or various components thereof, may be an example of means for performing various aspects of ambient IoT operations with an FSA architecture as described herein. For example, the communications manager 720 may include a report transmission component 725, a mode management component 730, a signal communication component 735, a control information reception component 740, a message transmission component 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The report transmission component 725 is capable of, configured to, or operable to support a means for transmitting a capability report that indicates a capability of the EH-capable device to use an FSA array at the EH-capable device, where the capability report indicates one or more modes supported by the EH-capable device in association with use of the FSA array. The mode management component 730 is capable of, configured to, or operable to support a means for operating, in accordance with the capability of the EH-capable device, in a first mode of the one or more modes, where operation in the first mode includes a first type of operation performed via a first antenna port associated with the FSA array. The signal communication component 735 is capable of, configured to, or operable to support a means for participating in communication of a first signal via the first antenna port in accordance with the first type of operation.

In some examples, the first mode is a single-port EH mode. In some examples, the first type of operation performed via the first antenna port associated with the FSA array is an EH operation.

In some examples, the signal communication component 735 is capable of, configured to, or operable to support a means for participating in communication of a second signal via a second antenna port in accordance with a second type of operation, where the first mode includes the first type of operation performed via the first antenna port associated with the FSA array and, concurrently, the second type of operation performed via the second antenna port, which is associated with the FSA array.

In some examples, the first signal is associated with a first CC frequency and with a first spatial direction, and the second signal is associated with a second CC frequency and with the first spatial direction.

In some examples, the first type of operation is an EH operation and the second type of operation is an EH operation. In some examples, the first type of operation is an EH operation and the second type of operation is an uplink or backscattering operation. In some examples, the first type of operation is an EH operation and the second type of operation is a downlink operation. In some examples, the first type of operation is a downlink operation and the second type of operation is an uplink operation.

In some examples, the control information reception component 740 is capable of, configured to, or operable to support a means for receiving a message indicating whether a reader wireless device supports the one or more modes of the EH-capable device, where participating in communication of the first signal is based on the message indicating that the reader wireless device supports the first mode.

In some examples, individual ones of the one or more modes are supported by a reader wireless device for corresponding time-frequency resources or procedures.

In some examples, the capability report indicates, for each mode of the one or more modes, a respective set of communication parameters supported by the EH-capable device for concurrently performing the first type of operation using the first antenna port and performing a second type of operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

In some examples, the capability report indicates a capability of the EH-capable device to switch from using the first mode to using a second mode of the one or more modes. In some examples, the capability report indicates a duration associated with performing the switch.

In some examples, the control information reception component 740 is capable of, configured to, or operable to support a means for receiving a message indicating a set of multiple resource sets for transmission of a RACH message. In some examples, the mode management component 730 is capable of, configured to, or operable to support a means for selecting a first resource set from the set of multiple resource sets based on the capability report indicating at least the first mode, where the first resource set is associated with the first mode based on a mapping between the one or more modes supported by the EH-capable device and the set of multiple resource sets. In some examples, the message transmission component 745 is capable of, configured to, or operable to support a means for transmitting the RACH message via the first resource set based on selecting the first resource set.

In some examples, the control information reception component 740 is capable of, configured to, or operable to support a means for receiving a first message indicating respective criteria associated with each mode of the one or more modes supported by the EH-capable device. In some examples, the mode management component 730 is capable of, configured to, or operable to support a means for selecting the first mode from the one or more modes based on first criteria associated with the first mode satisfying one or more threshold values. In some examples, the message transmission component 745 is capable of, configured to, or operable to support a means for transmitting a second message indicating the first mode based on selecting the first mode, where performance of the first type of operation is in accordance with the first mode based on transmitting the second message.

In some examples, the respective criteria include an available energy at the EH-capable device, a channel quality measurement, a configured link budget, a self-interference value, an energy storage capability of the EH-capable device, or any combination thereof.

In some examples, the message transmission component 745 is capable of, configured to, or operable to support a means for transmitting a message including a request to use the first mode, where participating in communication of the first signal in accordance with the first type of operation is based on transmitting the message.

In some examples, the control information reception component 740 is capable of, configured to, or operable to support a means for receiving a message indicating to use the first mode, where participating in communication of the first signal in accordance with the first type of operation is based on receiving the message.

In some examples, the message indicates one or more time domain resources associated with the first mode, one or more frequency domain resources associated with the first mode, one or more spatial domain resources associated with the first mode, or any combination thereof.

In some examples, the message is a DCI message, a SPS message, a semi-static message, a periodic message, a message communicated based on an occurrence of an event, or any combination thereof.

In some examples, the capability of the EH-capable device to use the FSA array at the EH-capable device further includes a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

Figure 8:
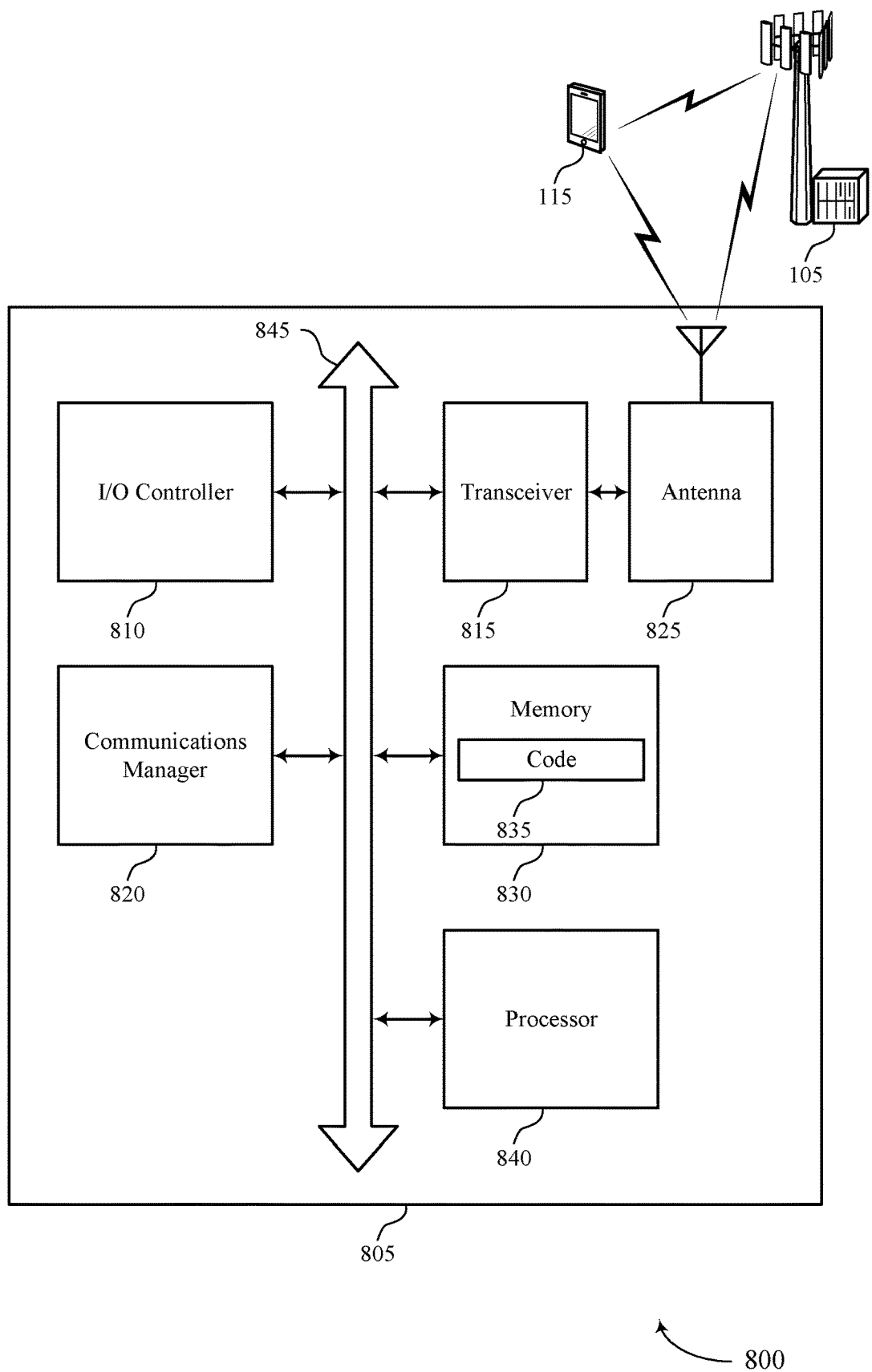
FIG. 8 shows a diagram of a system including a device that supports ambient IoT operations with an FSA architecture in accordance with one or more aspects of the present disclosure.

FIG. 8 shows a diagram of a system 800 including a device 805 that supports ambient IoT operations with an FSA architecture in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting ambient IoT operations with an FSA architecture). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting a capability report that indicates a capability of the EH-capable device to use an FSA array at the EH-capable device, where the capability report indicates one or more modes supported by the EH-capable device in association with use of the FSA array. The communications manager 820 is capable of, configured to, or operable to support a means for operating, in accordance with the capability of the EH-capable device, in a first mode of the one or more modes, where operation in the first mode includes a first type of operation performed via a first antenna port associated with the FSA array. The communications manager 820 is capable of, configured to, or operable to support a means for participating in communication of a first signal via the first antenna port in accordance with the first type of operation.

By including or configuring the communications manager 820 in accordance with examples as described herein, the device 805 may support techniques for enhanced operations by an EH-capable device, which may include performing one or more concurrent operations using one or more antenna ports of an FSA array, thereby improving performance of the EH-capable device.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of ambient IoT operations with an FSA architecture as described herein, or the at least one processor 840 and the at least one memory 830 may be otherwise configured to, individually or collectively, perform or support such operations.

Figure 9:
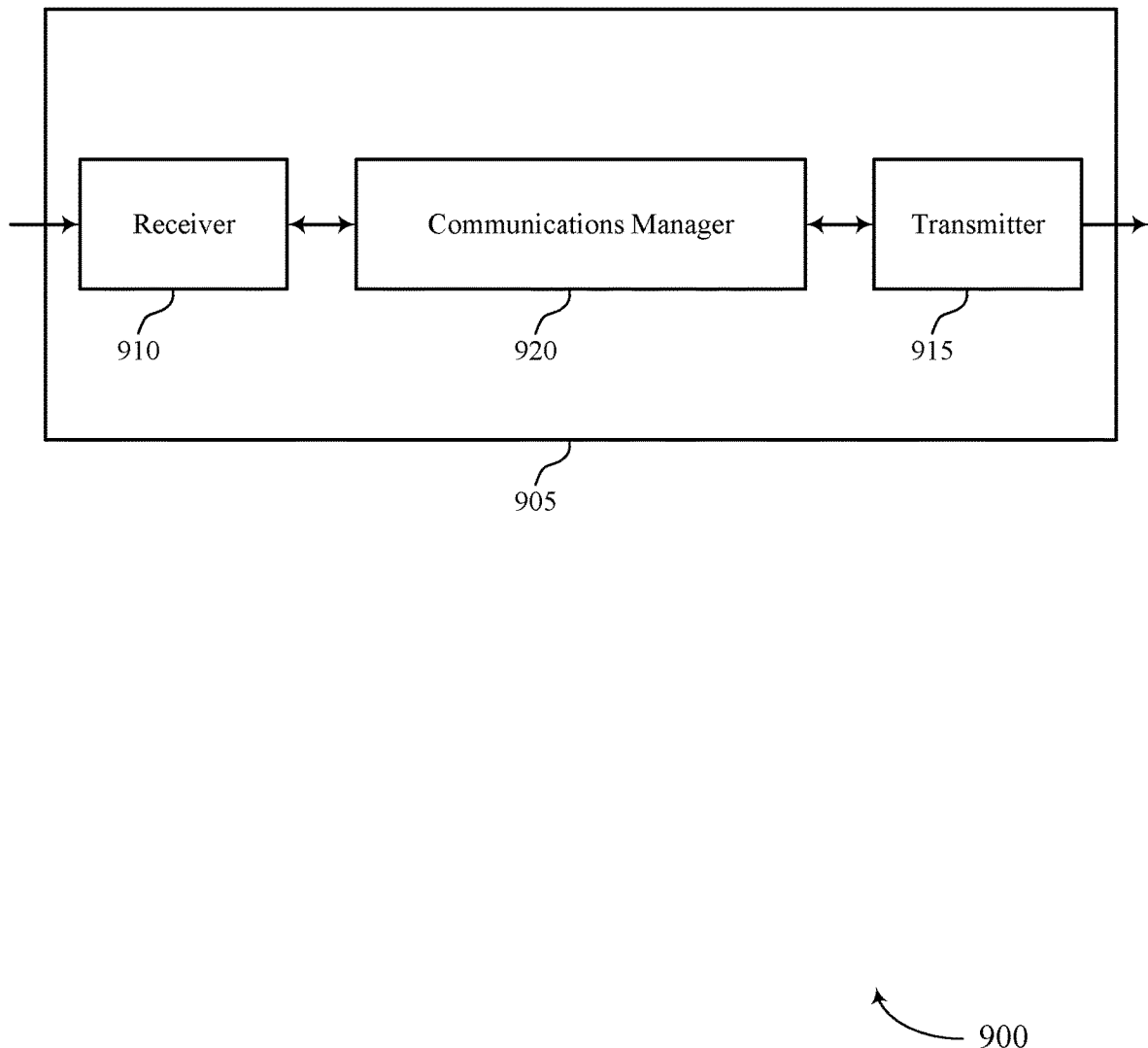
FIGS. 9 and 10 show block diagrams of devices that support ambient IoT operations with an FSA architecture in accordance with one or more aspects of the present disclosure.

FIG. 9 shows a block diagram 900 of a device 905 that supports ambient IoT operations with an FSA architecture in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of ambient IoT operations with an FSA architecture as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving a capability report that indicates a capability of an EH-capable device to use an FSA array at the EH-capable device, where the capability report indicates one or more modes supported by the EH-capable device in association with use of the FSA array. The communications manager 920 is capable of, configured to, or operable to support a means for participating in communication with the EH-capable device in accordance with a first mode indicated in the capability report, where the first mode is associated with at least a first type of operation at a first antenna port associated with the FSA array.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for enhanced operations by an EH-capable device, which may include performing one or more concurrent operations using one or more antenna ports of an FSA array, thereby improving performance of the EH-capable device.

Figure 10:
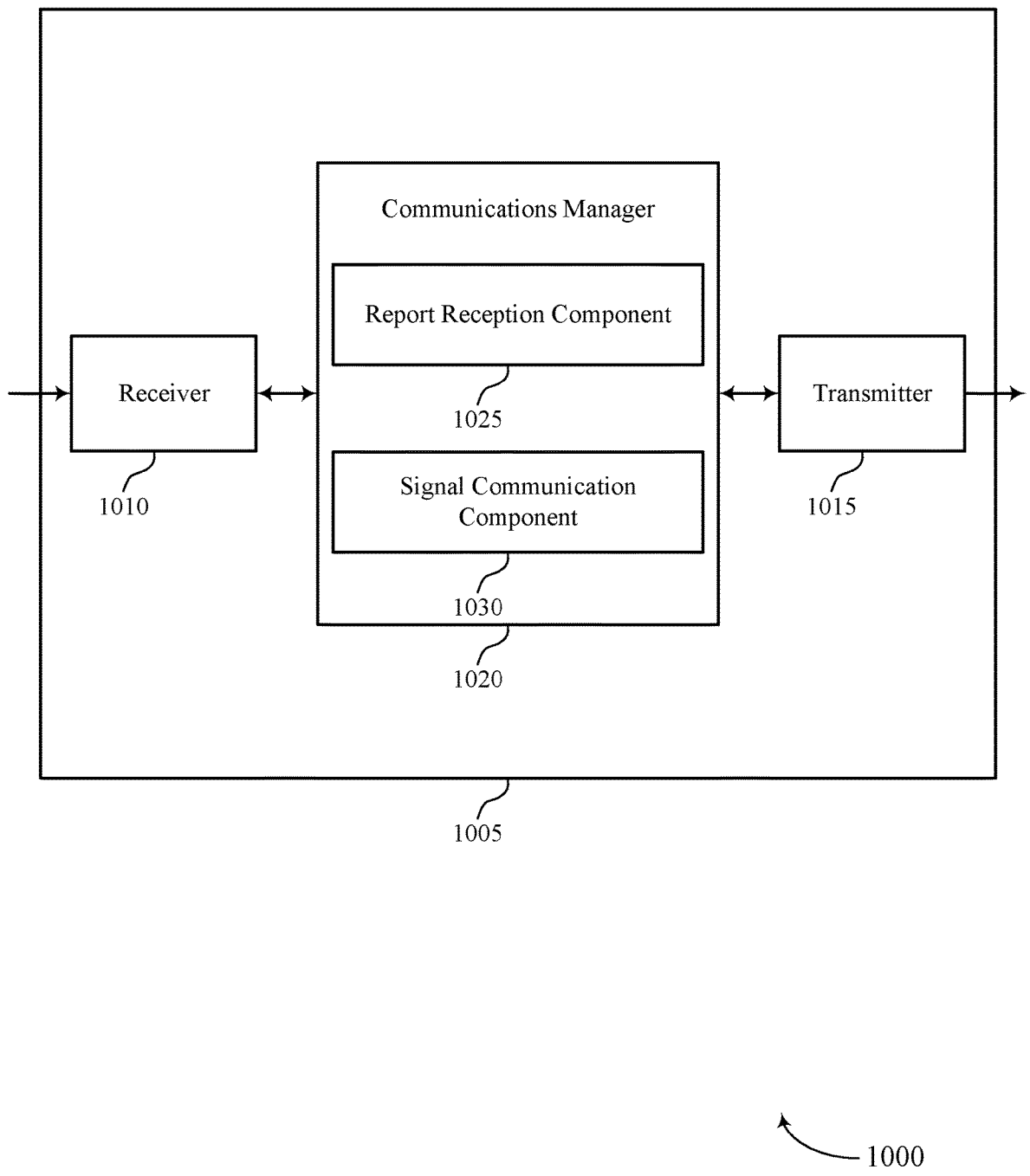

FIG. 10 shows a block diagram 1000 of a device 1005 that supports ambient IoT operations with an FSA architecture in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of ambient IoT operations with an FSA architecture as described herein. For example, the communications manager 1020 may include a report reception component 1025 a signal communication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The report reception component 1025 is capable of, configured to, or operable to support a means for receiving a capability report that indicates a capability of an EH-capable device to use an FSA array at the EH-capable device, where the capability report indicates one or more modes supported by the EH-capable device in association with use of the FSA array. The signal communication component 1030 is capable of, configured to, or operable to support a means for participating in communication with the EH-capable device in accordance with a first mode indicated in the capability report, where the first mode is associated with at least a first type of operation at a first antenna port associated with the FSA array.

Figure 11:
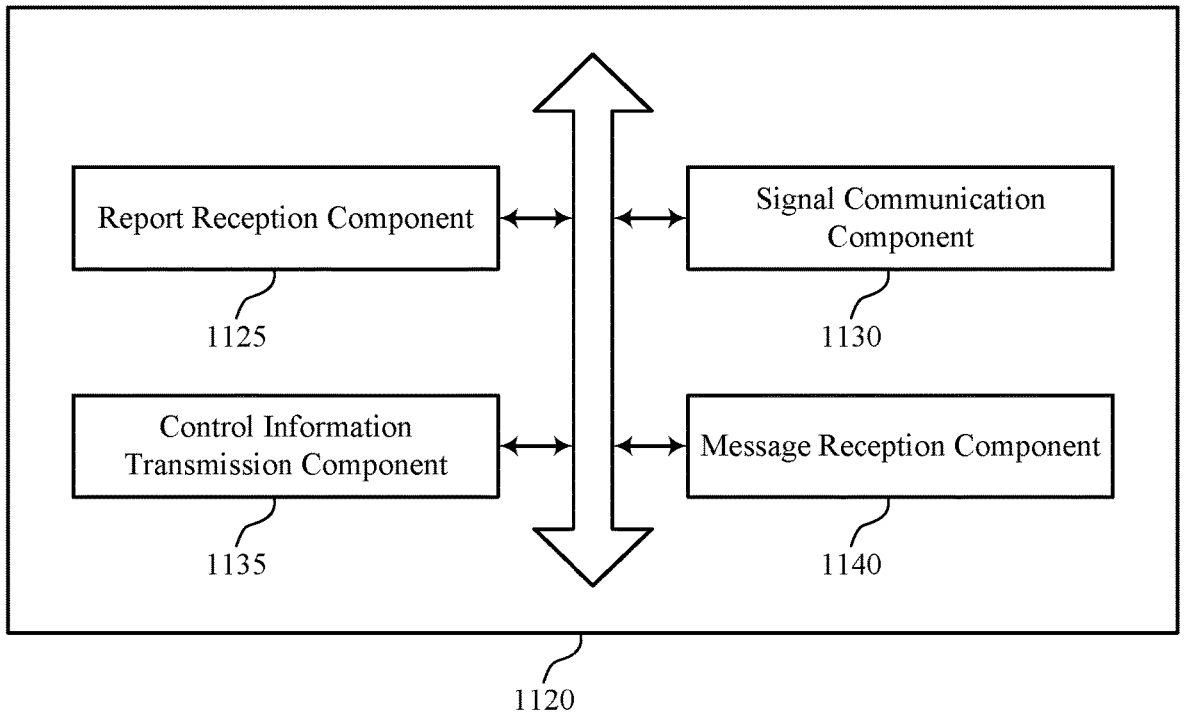
FIG. 11 shows a block diagram of a communications manager that supports ambient IoT operations with an FSA architecture in accordance with one or more aspects of the present disclosure.

FIG. 11 shows a block diagram 1100 of a communications manager 1120 that supports ambient IoT operations with an FSA architecture in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of ambient IoT operations with an FSA architecture as described herein. For example, the communications manager 1120 may include a report reception component 1125, a signal communication component 1130, a control information transmission component 1135, a message reception component 1140, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The report reception component 1125 is capable of, configured to, or operable to support a means for receiving a capability report that indicates a capability of an EH-capable device to use an FSA array at the EH-capable device, where the capability report indicates one or more modes supported by the EH-capable device in association with use of the FSA array. The signal communication component 1130 is capable of, configured to, or operable to support a means for participating in communication with the EH-capable device in accordance with a first mode indicated in the capability report, where the first mode is associated with at least a first type of operation at a first antenna port associated with the FSA array.

In some examples, the first mode is a single-port EH mode. In some examples, the first type of operation is an EH operation.

In some examples, the first mode includes the first type of operation performed at the first antenna port associated with the FSA array and, concurrently, a second type of operation performed at a second antenna port associated with the FSA array.

In some examples, to support participating in communication with the EH-capable device, the signal communication component 1130 is capable of, configured to, or operable to support a means for communicating a first signal associated with the first type of operation, where the first signal is associated with a first CC frequency and with a first spatial direction. In some examples, to support participating in communication with the EH-capable device, the signal communication component 1130 is capable of, configured to, or operable to support a means for communicating a second signal associated with the second type of operation, where the second signal is associated with a second CC frequency and with the first spatial direction.

In some examples, the first type of operation is an EH operation and the second type of operation is an EH operation. In some examples, the first type of operation is an EH operation and the second type of operation is an uplink or backscattering operation. In some examples, the first type of operation is an EH operation and the second type of operation is a downlink operation. In some examples, the first type of operation is a downlink operation and the second type of operation is an uplink operation.

In some examples, the control information transmission component 1135 is capable of, configured to, or operable to support a means for transmitting a message indicating whether the reader wireless device supports the one or more modes of the EH-capable device, where participating in communication with the EH-capable device is based on the message indicating that the reader wireless device supports the first mode.

In some examples, individual ones of the one or more modes are supported by the reader wireless device for corresponding time-frequency resources or procedures.

In some examples, the capability report indicates, for each mode of the one or more modes, a respective set of communication parameters supported by the EH-capable device for concurrently performing the first type of operation using the first antenna port and performing a type of second operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

In some examples, the capability report indicates a capability of the EH-capable device to switch from using the first mode to using a second mode of the one or more modes. In some examples, the capability report indicates a duration associated with performing the switch.

In some examples, the control information transmission component 1135 is capable of, configured to, or operable to support a means for transmitting a message indicating a set of multiple resource sets for communicating a RACH message. In some examples, the message reception component 1140 is capable of, configured to, or operable to support a means for receiving the RACH message via a first resource set of the set of multiple resource sets, where the first resource set is associated with the first mode based on a mapping between the one or more modes supported by the EH-capable device and the set of multiple resource sets, and where receiving the random access message via the first resource set indicates a selection of the first mode by the EH-capable device.

In some examples, the control information transmission component 1135 is capable of, configured to, or operable to support a means for transmitting a first message indicating respective criteria associated with each mode of the one or more modes supported by the EH-capable device. In some examples, the message reception component 1140 is capable of, configured to, or operable to support a means for receiving a second message indicating the first mode based on transmitting the first message, where the second message indicates a selection of the first mode by the EH-capable device based on first criteria associated with the first mode satisfying one or more threshold values.

In some examples, the respective criteria include an available energy at the EH-capable device, a channel quality measurement, a configured link budget, a self-interference value, an energy storage capability of the EH-capable device, or any combination thereof.

In some examples, the message reception component 1140 is capable of, configured to, or operable to support a means for receiving a message including a request to use the first mode, where participating in communication with the EH-capable device in accordance with the first type of operation is based on receiving the message.

In some examples, the control information transmission component 1135 is capable of, configured to, or operable to support a means for transmitting a message indicating to use the first mode, where participating in communication with the EH-capable device in accordance with the first type of operation is based on transmitting the message.

In some examples, the message indicates one or more time domain resources associated with the first mode, one or more frequency domain resources associated with the first mode, one or more spatial domain resources associated with the first mode, or any combination thereof.

In some examples, the message is a DCI message, a SPS message, a semi-static message, a periodic message, a message communicated based on an occurrence of an event, or any combination thereof.

In some examples, the capability of the EH-capable device to use the FSA array at the EH-capable device further includes a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

Figure 12:
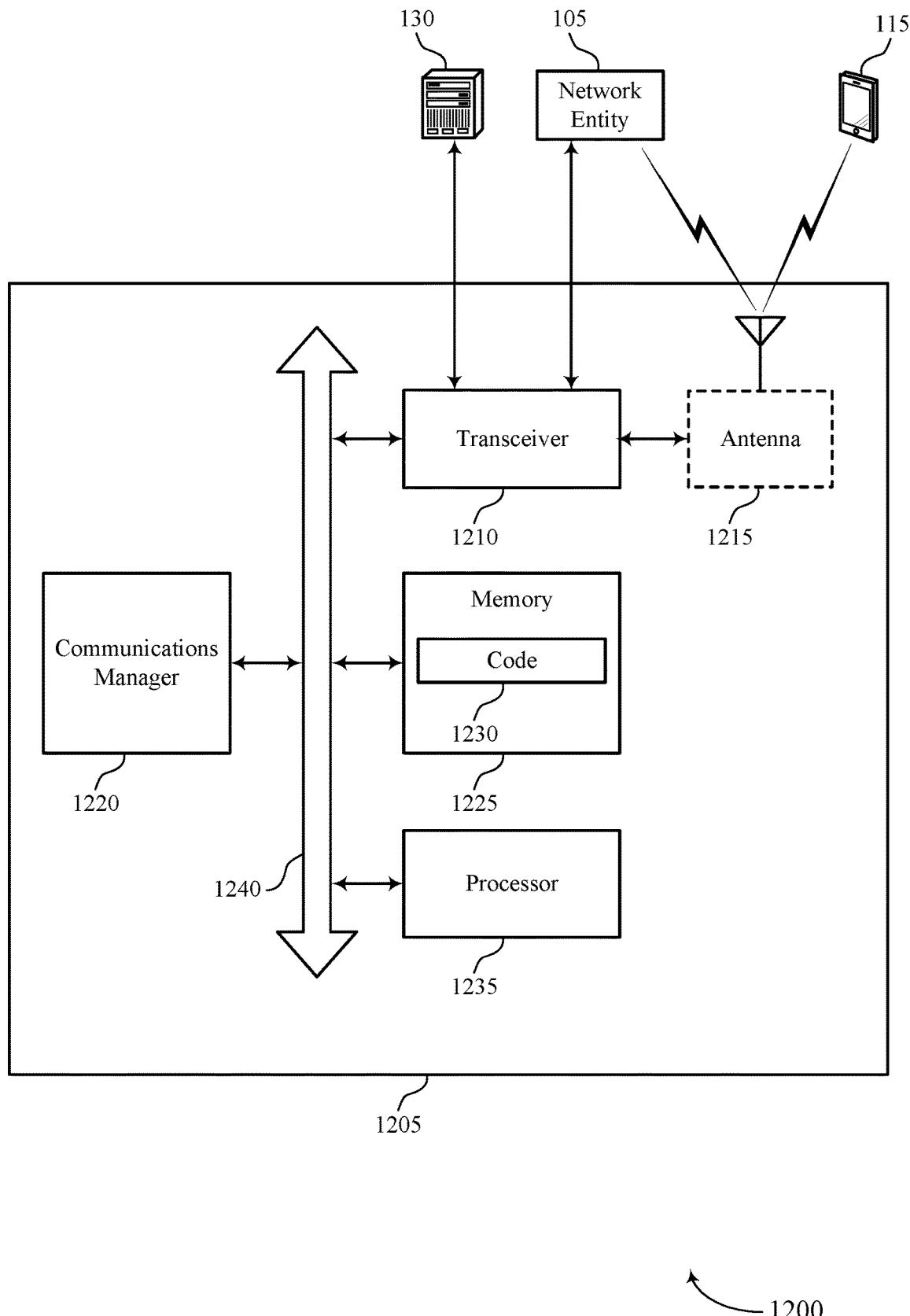
FIG. 12 shows a diagram of a system including a device that supports ambient IoT operations with an FSA architecture in accordance with one or more aspects of the present disclosure.

FIG. 12 shows a diagram of a system 1200 including a device 1205 that supports ambient IoT operations with an FSA architecture in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting ambient IoT operations with an FSA architecture). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving a capability report that indicates a capability of an EH-capable device to use an FSA array at the EH-capable device, where the capability report indicates one or more modes supported by the EH-capable device in association with use of the FSA array. The communications manager 1220 is capable of, configured to, or operable to support a means for participating in communication with the EH-capable device in accordance with a first mode indicated in the capability report, where the first mode is associated with at least a first type of operation at a first antenna port associated with the FSA array.

By including or configuring the communications manager 1220 in accordance with examples as described herein, the device 1205 may support techniques for enhanced operations by an EH-capable device, which may include performing one or more concurrent operations using one or more antenna ports of an FSA array, thereby improving performance of the EH-capable device.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of ambient IoT operations with an FSA architecture as described herein, or the at least one processor 1235 and the at least one memory 1225 may be otherwise configured to, individually or collectively, perform or support such operations.

Figure 13:
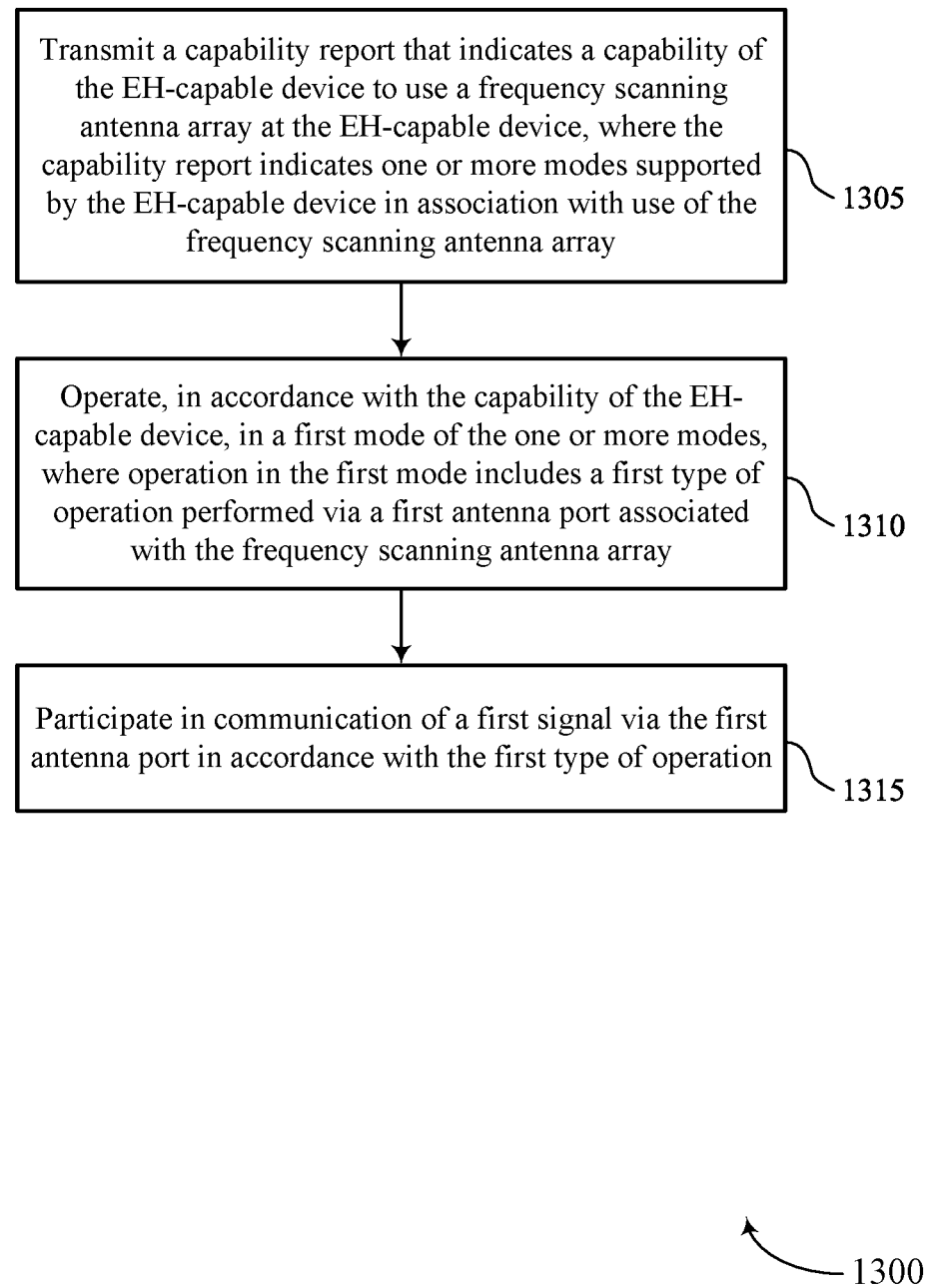
FIGS. 13 and 14 show flowcharts illustrating methods that support ambient IoT operations with an FSA architecture in accordance with one or more aspects of the present disclosure.

FIG. 13 shows a flowchart illustrating a method 1300 that supports ambient IoT operations with an FSA architecture in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a capability report that indicates a capability of the EH-capable device to use an FSA array at the EH-capable device, where the capability report indicates one or more modes supported by the EH-capable device in association with use of the FSA array. The operations of 1305 may be performed in accordance with examples as disclosed herein. In some examples, aspects of the operations of 1305 may be performed by a report transmission component 725 as described with reference to FIG. 7.

At 1310, the method may include operating, in accordance with the capability of the EH-capable device, in a first mode of the one or more modes, where operation in the first mode includes a first type of operation performed via a first antenna port associated with the FSA array. The operations of 1310 may be performed in accordance with examples as disclosed herein. In some examples, aspects of the operations of 1310 may be performed by a mode management component 730 as described with reference to FIG. 7.

At 1315, the method may include participating in communication of a first signal via the first antenna port in accordance with the first type of operation. The operations of 1315 may be performed in accordance with examples as disclosed herein. In some examples, aspects of the operations of 1315 may be performed by a signal communication component 735 as described with reference to FIG. 7.

Figure 14:
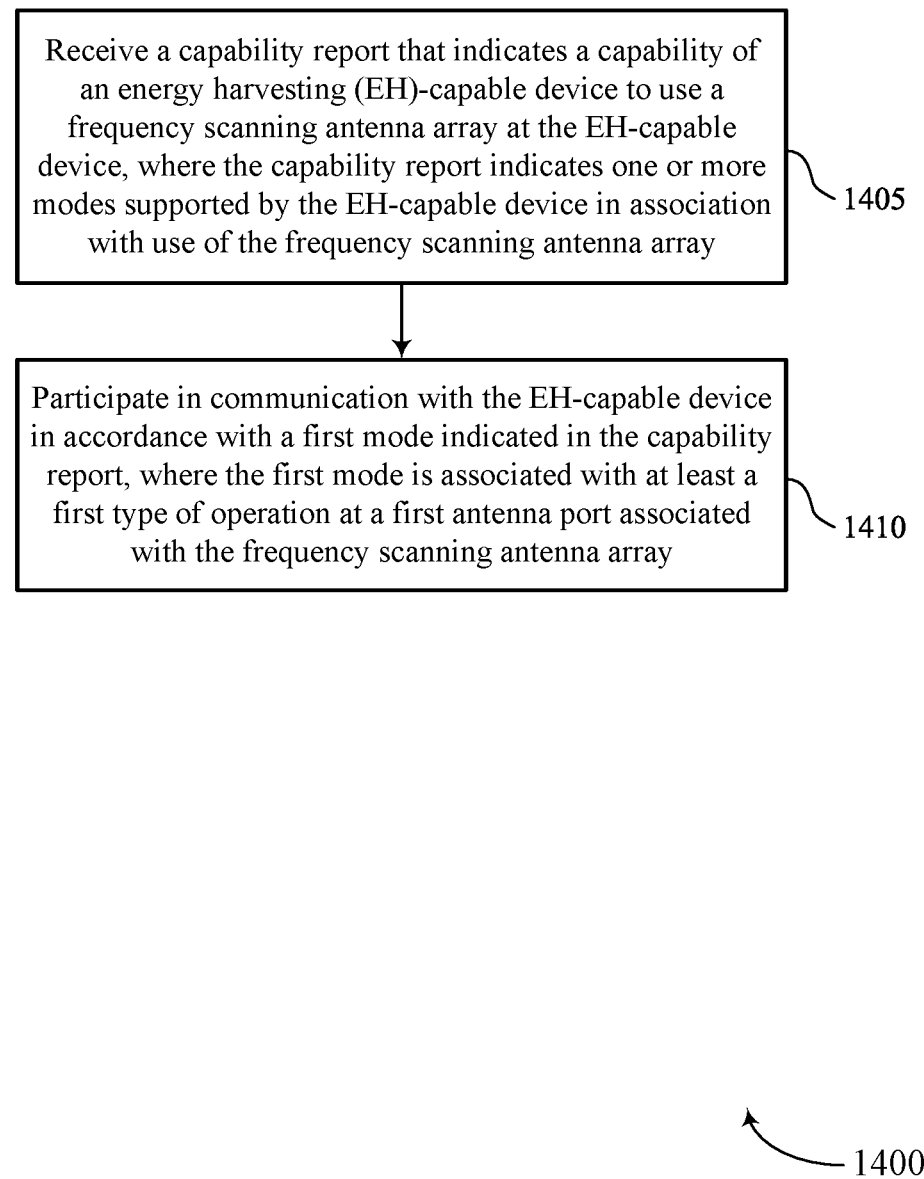

FIG. 14 shows a flowchart illustrating a method 1400 that supports ambient IoT operations with an FSA architecture in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include receiving a capability report that indicates a capability of an EH-capable device to use an FSA array at the EH-capable device, where the capability report indicates one or more modes supported by the EH-capable device in association with use of the FSA array. The operations of 1405 may be performed in accordance with examples as disclosed herein. In some examples, aspects of the operations of 1405 may be performed by a report reception component 1125 as described with reference to FIG. 11.

At 1410, the method may include participating in communication with the EH-capable device in accordance with a first mode indicated in the capability report, where the first mode is associated with at least a first type of operation at a first antenna port associated with the FSA array. The operations of 1410 may be performed in accordance with examples as disclosed herein. In some examples, aspects of the operations of 1410 may be performed by a signal communication component 1130 as described with reference to FIG. 11.

The following provides an overview of aspects of the present disclosure:

Aspect 1: A method for wireless communications at an EH-capable device, comprising: transmitting a capability report that indicates a capability of the EH-capable device to use an FSA array at the EH-capable device, wherein the capability report indicates one or more modes supported by the EH-capable device in association with use of the FSA array; operating, in accordance with the capability of the EH-capable device, in a first mode of the one or more modes, wherein operation in the first mode comprises a first type of operation performed via a first antenna port associated with the FSA array; and participating in communication of a first signal via the first antenna port in accordance with the first type of operation.

Aspect 2: The method of aspect 1, wherein the first mode is a single-port EH mode, and the first type of operation performed via the first antenna port associated with the FSA array is an EH operation.

Aspect 3: The method of aspect 1, further comprising: participating in communication of a second signal via a second antenna port in accordance with a second type of operation, wherein the first mode comprises the first type of operation performed via the first antenna port associated with the FSA array and, concurrently, the second type of operation performed via the second antenna port, which is associated with the FSA array.

Aspect 4: The method of aspect 3, wherein the first signal is associated with a first CC frequency and with a first spatial direction, and the second signal is associated with a second CC frequency and with the first spatial direction.

Aspect 5: The method of aspect 4, wherein the first type of operation is an EH operation and the second type of operation is an EH operation, or the first type of operation is an EH operation and the second type of operation is an uplink or backscattering operation, or the first type of operation is an EH operation and the second type of operation is a downlink operation, or the first type of operation is a downlink operation and the second type of operation is an uplink operation.

Aspect 6: The method of any of aspects 1 through 5, further comprising: receiving a message indicating whether a reader wireless device supports the one or more modes of the EH-capable device, wherein participating in communication of the first signal is based at least in part on the message indicating that the reader wireless device supports the first mode.

Aspect 7: The method of any of aspects 1 through 6, wherein individual ones of the one or more modes are supported by a reader wireless device for corresponding time-frequency resources or procedures.

Aspect 8: The method of any of aspects 1 through 7, wherein the capability report indicates, for each mode of the one or more modes, a respective set of communication parameters supported by the EH-capable device for concurrently performing the first type of operation using the first antenna port and performing a second type of operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

Aspect 9: The method of any of aspects 1 through 8, wherein the capability report indicates a capability of the EH-capable device to switch from using the first mode to using a second mode of the one or more modes, and the capability report indicates a duration associated with performing the switch.

Aspect 10: The method of any of aspects 1 through 9, further comprising: receiving a message indicating a plurality of resource sets for transmission of a RACH message; selecting a first resource set from the plurality of resource sets based at least in part on the capability report indicating at least the first mode, wherein the first resource set is associated with the first mode based at least in part on a mapping between the one or more modes supported by the EH-capable device and the plurality of resource sets; and transmitting the RACH message via the first resource set based at least in part on selecting the first resource set.

Aspect 11: The method of any of aspects 1 through 10, further comprising: receiving a first message indicating respective criteria associated with each mode of the one or more modes supported by the EH-capable device; selecting the first mode from the one or more modes based at least in part on first criteria associated with the first mode satisfying one or more threshold values; and transmitting a second message indicating the first mode based at least in part on selecting the first mode, wherein performance of the first type of operation is in accordance with the first mode based at least in part on transmitting the second message.

Aspect 12: The method of aspect 11, wherein the respective criteria comprise an available energy at the EH-capable device, a channel quality measurement, a configured link budget, a self-interference value, an energy storage capability of the EH-capable device, or any combination thereof.

Aspect 13: The method of any of aspects 1 through 12, further comprising: transmitting a message comprising a request to use the first mode, wherein participating in communication of the first signal in accordance with the first type of operation is based at least in part on transmitting the message.

Aspect 14: The method of any of aspects 1 through 13, further comprising: receiving a message indicating to use the first mode, wherein participating in communication of the first signal in accordance with the first type of operation is based at least in part on receiving the message.

Aspect 15: The method of aspect 14, wherein the message indicates one or more time domain resources associated with the first mode, one or more frequency domain resources associated with the first mode, one or more spatial domain resources associated with the first mode, or any combination thereof.

Aspect 16: The method of any of aspects 14 through 15, wherein the message is a DCI message, a SPS message, a semi-static message, a periodic message, a message communicated based at least in part on an occurrence of an event, or any combination thereof.

Aspect 17: The method of any of aspects 1 through 16, wherein the capability of the EH-capable device to use the FSA array at the EH-capable device further comprises a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

Aspect 18: A method for wireless communications by a reader wireless device, comprising: receiving a capability report that indicates a capability of an EH-capable device to use an FSA array at the EH-capable device, wherein the capability report indicates one or more modes supported by the EH-capable device in association with use of the FSA array; and participating in communication with the EH-capable device in accordance with a first mode indicated in the capability report, wherein the first mode is associated with at least a first type of operation at a first antenna port associated with the FSA array.

Aspect 19: The method of aspect 18, wherein the first mode is a single-port EH mode, and the first type of operation is an EH operation.

Aspect 20: The method of aspect 18, wherein the first mode comprises the first type of operation performed at the first antenna port associated with the FSA array and, concurrently, a second type of operation performed at a second antenna port associated with the FSA array.

Aspect 21: The method of aspect 20, wherein participating in communication with the EH-capable device comprises: communicating a first signal associated with the first type of operation, wherein the first signal is associated with a first CC frequency and with a first spatial direction; and communicating a second signal associated with the second type of operation, wherein the second signal is associated with a second CC frequency and with the first spatial direction.

Aspect 22: The method of any of aspects 20 through 21, wherein the first type of operation is an EH operation and the second type of operation is an EH operation, or the first type of operation is an EH operation and the second type of operation is an uplink or backscattering operation, or the first type of operation is an EH operation and the second type of operation is a downlink operation, or the first type of operation is a downlink operation and the second type of operation is an uplink operation.

Aspect 23: The method of any of aspects 18 through 22, further comprising: transmitting a message indicating whether the reader wireless device supports the one or more modes of the EH-capable device, wherein participating in communication with the EH-capable device is based at least in part on the message indicating that the reader wireless device supports the first mode.

Aspect 24: The method of any of aspects 18 through 23, wherein individual ones of the one or more modes are supported by the reader wireless device for corresponding time-frequency resources or procedures.

Aspect 25: The method of any of aspects 18 through 24, wherein the capability report indicates, for each mode of the one or more modes, a respective set of communication parameters supported by the EH-capable device for concurrently performing the first type of operation using the first antenna port and performing a type of second operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

Aspect 26: The method of any of aspects 18 through 25, wherein the capability report indicates a capability of the EH-capable device to switch from using the first mode to using a second mode of the one or more modes, and the capability report indicates a duration associated with performing the switch.

Aspect 27: The method of any of aspects 18 through 26, further comprising: transmitting a message indicating a plurality of resource sets for communicating a RACH message; and receiving the RACH message via a first resource set of the plurality of resource sets, wherein the first resource set is associated with the first mode based at least in part on a mapping between the one or more modes supported by the EH-capable device and the plurality of resource sets, and wherein receiving the random access message via the first resource set indicates a selection of the first mode by the EH-capable device.

Aspect 28: The method of any of aspects 18 through 27, further comprising: transmitting a first message indicating respective criteria associated with each mode of the one or more modes supported by the EH-capable device; and receiving a second message indicating the first mode based at least in part on transmitting the first message, wherein the second message indicates a selection of the first mode by the EH-capable device based at least in part on first criteria associated with the first mode satisfying one or more threshold values.

Aspect 29: The method of aspect 28, wherein the respective criteria comprise an available energy at the EH-capable device, a channel quality measurement, a configured link budget, a self-interference value, an energy storage capability of the EH-capable device, or any combination thereof.

Aspect 30: The method of any of aspects 18 through 29, further comprising: receiving a message comprising a request to use the first mode, wherein participating in communication with the EH-capable device in accordance with the first type of operation is based at least in part on receiving the message.

Aspect 31: The method of any of aspects 18 through 30, further comprising: transmitting a message indicating to use the first mode, wherein participating in communication with the EH-capable device in accordance with the first type of operation is based at least in part on transmitting the message.

Aspect 32: The method of aspect 31, wherein the message indicates one or more time domain resources associated with the first mode, one or more frequency domain resources associated with the first mode, one or more spatial domain resources associated with the first mode, or any combination thereof.

Aspect 33: The method of any of aspects 31 through 32, wherein the message is a DCI message, a SPS message, a semi-static message, a periodic message, a message communicated based at least in part on an occurrence of an event, or any combination thereof.

Aspect 34: The method of any of aspects 18 through 33, wherein the capability of the EH-capable device to use the FSA array at the EH-capable device further comprises a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

Aspect 35: An EH-capable device for wireless communications, comprising one or more memories storing processor-executable code, and one or more processors coupled with the one or more memories and individually or collectively operable to execute the code to cause the EH-capable device to perform a method of any of aspects 1 through 17.

Aspect 36: An EH-capable device for wireless communications, comprising at least one means for performing a method of any of aspects 1 through 17.

Aspect 37: A non-transitory computer-readable medium storing code for wireless communications, the code comprising instructions executable by one or more processors to perform a method of any of aspects 1 through 17.

Aspect 38: A reader wireless device for wireless communications, comprising one or more memories storing processor-executable code, and one or more processors coupled with the one or more memories and individually or collectively operable to execute the code to cause the reader wireless device to perform a method of any of aspects 18 through 34.

Aspect 39: A reader wireless device for wireless communications, comprising at least one means for performing a method of any of aspects 18 through 34.

Aspect 40: A non-transitory computer-readable medium storing code for wireless communications, the code comprising instructions executable by one or more processors to perform a method of any of aspects 18 through 34.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An energy harvesting (EH)-capable device for wireless communications, comprising:
    one or more memories storing processor-executable code; and
    one or more processors coupled with the one or more memories and individually or collectively operable to execute the code to cause the EH-capable device to:
        transmit a capability report that indicates a capability of the EH-capable device to use a frequency scanning antenna array at the EH-capable device, wherein the capability report indicates one or more modes supported by the EH-capable device in association with use of the frequency scanning antenna array;
        operate, in accordance with the capability of the EH-capable device, in a first mode of the one or more modes, wherein operation in the first mode comprises a first type of operation performed via a first antenna port associated with the frequency scanning antenna array; and
        participate in communication of a first signal via the first antenna port in accordance with the first type of operation.

2. The EH-capable device of claim 1, wherein the first mode is a single-port energy harvesting mode, and wherein the first type of operation performed via the first antenna port associated with the frequency scanning antenna array is an energy harvesting operation.

3. The EH-capable device of claim 1, wherein the one or more processors are individually or collectively further operable to execute the code to cause the EH-capable device to:
    participate in communication of a second signal via a second antenna port in accordance with a second type of operation, wherein the first mode comprises the first type of operation performed via the first antenna port associated with the frequency scanning antenna array and, concurrently, the second type of operation performed via the second antenna port, which is associated with the frequency scanning antenna array.

4. The EH-capable device of claim 3, wherein the first signal is associated with a first component carrier frequency and with a first spatial direction, and the second signal is associated with a second component carrier frequency and with the first spatial direction.

5. The EH-capable device of claim 4, wherein the first type of operation is an energy harvesting operation and the second type of operation is an energy harvesting operation, or the first type of operation is an energy harvesting operation and the second type of operation is an uplink or backscattering operation, or the first type of operation is an energy harvesting operation and the second type of operation is a downlink operation, or the first type of operation is a downlink operation and the second type of operation is an uplink operation.

6. The EH-capable device of claim 1, wherein the one or more processors are individually or collectively further operable to execute the code to cause the EH-capable device to:
    receive a message indicating whether a reader wireless device supports the one or more modes of the EH-capable device, wherein participating in communication of the first signal is based at least in part on the message indicating that the reader wireless device supports the first mode.

7. The EH-capable device of claim 1, wherein individual ones of the one or more modes are supported by a reader wireless device for corresponding time-frequency resources or procedures.

8. The EH-capable device of claim 1, wherein:
    the capability report indicates, for each mode of the one or more modes, a respective set of communication parameters supported by the EH-capable device for concurrently performing the first type of operation using the first antenna port and performing a second type of operation using a second antenna port in accordance with a corresponding mode of the one or more modes; and
    the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

9. The EH-capable device of claim 1, wherein the capability report indicates a capability of the EH-capable device to switch from using the first mode to using a second mode of the one or more modes, and wherein the capability report indicates a duration associated with performing the switch.

10. The EH-capable device of claim 1, wherein the one or more processors are individually or collectively further operable to execute the code to cause the EH-capable device to:
receive a message indicating a plurality of resource sets for transmission of a random access channel message;
select a first resource set from the plurality of resource sets based at least in part on the capability report indicating at least the first mode, wherein the first resource set is associated with the first mode based at least in part on a mapping between the one or more modes supported by the EH-capable device and the plurality of resource sets; and
transmit the random access channel message via the first resource set based at least in part on selecting the first resource set.

11. The EH-capable device of claim 1, wherein the one or more processors are individually or collectively further operable to execute the code to cause the EH-capable device to:
receive a first message indicating respective criteria associated with each mode of the one or more modes supported by the EH-capable device;
select the first mode from the one or more modes based at least in part on first criteria associated with the first mode satisfying one or more threshold values; and
transmit a second message indicating the first mode based at least in part on selecting the first mode, wherein performance of the first type of operation is in accordance with the first mode based at least in part on transmitting the second message.

12. The EH-capable device of claim 11, wherein the respective criteria comprise an available energy at the EH-capable device, a channel quality measurement, a configured link budget, a self-interference value, an energy storage capability of the EH-capable device, or any combination thereof.

13. The EH-capable device of claim 1, wherein the one or more processors are individually or collectively further operable to execute the code to cause the EH-capable device to:
transmit a message comprising a request to use the first mode, wherein participating in communication of the first signal in accordance with the first type of operation is based at least in part on transmitting the message.

14. The EH-capable device of claim 1, wherein the one or more processors are individually or collectively further operable to execute the code to cause the EH-capable device to:
receive a message indicating to use the first mode, wherein participating in communication of the first signal in accordance with the first type of operation is based at least in part on receiving the message.

15. The EH-capable device of claim 14, wherein the message indicates one or more time domain resources associated with the first mode, one or more frequency domain resources associated with the first mode, one or more spatial domain resources associated with the first mode, or any combination thereof.

16. The EH-capable device of claim 14, wherein the message is a downlink control information message, a semi-persistently scheduled message, a semi-static message, a periodic message, a message communicated based at least in part on an occurrence of an event, or any combination thereof.

17. The EH-capable device of claim 1, wherein the capability of the EH-capable device to use the frequency scanning antenna array at the EH-capable device further comprises a beamwidth supported by the EH-capable device, a bandwidth supported by the EH-capable device, a set of operational frequency resources supported by the EH-capable device, an angular beamforming range supported by the EH-capable device, a gain level associated with the EH-capable device, an energy storage status of the EH-capable device, an energy storage conversion efficiency of the EH-capable device, or any combination thereof.

18. A reader wireless device, comprising:
one or more memories storing processor-executable code; and
one or more processors coupled with the one or more memories and individually or collectively operable to execute the code to cause the reader wireless device to:
receive a capability report that indicates a capability of an energy harvesting (EH)-capable device to use a frequency scanning antenna array at the EH-capable device, wherein the capability report indicates one or more modes supported by the EH-capable device in association with use of the frequency scanning antenna array; and
participate in communication with the EH-capable device in accordance with a first mode indicated in the capability report, wherein the first mode is associated with at least a first type of operation at a first antenna port associated with the frequency scanning antenna array.

19. The reader wireless device of claim 18, wherein the first mode is a single-port energy harvesting mode, and the first type of operation is an energy harvesting operation.

20. The reader wireless device of claim 18, wherein the first mode comprises the first type of operation performed at the first antenna port associated with the frequency scanning antenna array and, concurrently, a second type of operation performed at a second antenna port associated with the frequency scanning antenna array.

21. The reader wireless device of claim 20, wherein, to participate in communication with the EH-capable device, the one or more processors are individually or collectively operable to execute the code to cause the reader wireless device to:
communicate a first signal associated with the first type of operation, wherein the first signal is associated with a first component carrier frequency and with a first spatial direction; and
communicate a second signal associated with the second type of operation, wherein the second signal is associated with a second component carrier frequency and with the first spatial direction.

22. The reader wireless device of claim 20, wherein the first type of operation is an energy harvesting operation and the second type of operation is an energy harvesting operation, or the first type of operation is an energy harvesting operation and the second type of operation is an uplink or backscattering operation, or the first type of operation is an energy harvesting operation and the second type of operation is a downlink operation, or the first type of operation is a downlink operation and the second type of operation is an uplink operation.

23. The reader wireless device of claim 18, wherein the one or more processors are individually or collectively further operable to execute the code to cause the reader wireless device to:

transmit a message indicating whether the reader wireless device supports the one or more modes of the EH-capable device, wherein participating in communication with the EH-capable device is based at least in part on the message indicating that the reader wireless device supports the first mode.

24. The reader wireless device of claim 18, wherein individual ones of the one or more modes are supported by the reader wireless device for corresponding time-frequency resources or procedures.

25. The reader wireless device of claim 18, wherein:

the capability report indicates, for each mode of the one or more modes, a respective set of communication parameters supported by the EH-capable device for concurrently performing the first type of operation using the first antenna port and performing a type of second operation using a second antenna port in accordance with a corresponding mode of the one or more modes; and the respective set of communication parameters indicate first frequency resources associated with the first type of operation, second frequency resources associated with the second type of operation, one or more first angular beamforming directions associated with the first type of operation, one or more second angular beamforming directions associated with the second type of operation, or any combination thereof for the corresponding mode.

26. The reader wireless device of claim 18, wherein the capability report indicates a capability of the EH-capable device to switch from using the first mode to using a second mode of the one or more modes, and wherein the capability report indicates a duration associated with performing the switch.

27. The reader wireless device of claim 18, wherein the one or more processors are individually or collectively further operable to execute the code to cause the reader wireless device to:

transmit a message indicating a plurality of resource sets for communicating a random access channel message; and receive the random access channel message via a first resource set of the plurality of resource sets, wherein the first resource set is associated with the first mode based at least in part on a mapping between the one or more modes supported by the EH-capable device and the plurality of resource sets, and wherein receiving the random access message via the first resource set indicates a selection of the first mode by the EH-capable device.

28. The reader wireless device of claim 18, wherein the one or more processors are individually or collectively further operable to execute the code to cause the reader wireless device to:

transmit a first message indicating respective criteria associated with each mode of the one or more modes supported by the EH-capable device; and receive a second message indicating the first mode based at least in part on transmitting the first message, wherein the second message indicates a selection of the first mode by the EH-capable device based at least in part on first criteria associated with the first mode satisfying one or more threshold values.

29. A method for wireless communications at an energy harvesting (EH)-capable device, comprising:

transmitting a capability report that indicates a capability of the EH-capable device to use a frequency scanning antenna array at the EH-capable device, wherein the capability report indicates one or more modes supported by the EH-capable device in association with use of the frequency scanning antenna array;

operating, in accordance with the capability of the EH-capable device, in a first mode of the one or more modes, wherein operation in the first mode comprises a first type of operation performed via a first antenna port associated with the frequency scanning antenna array; and participating in communication of a first signal via the first antenna port in accordance with the first type of operation.

30. A method for wireless communications by a reader wireless device, comprising:

receiving a capability report that indicates a capability of an energy harvesting (EH)-capable device to use a frequency scanning antenna array at the EH-capable device, wherein the capability report indicates one or more modes supported by the EH-capable device in association with use of the frequency scanning antenna array; and participating in communication with the EH-capable device in accordance with a first mode indicated in the capability report, wherein the first mode is associated with at least a first type of operation at a first antenna port associated with the frequency scanning antenna array.

* * * * *